United States Patent
Elshafie et al.

(10) Patent No.: US 12,155,468 B2
(45) Date of Patent: Nov. 26, 2024

(54) COMMUNICATIONS STATE SWITCHING OF A BASE STATION

(71) Applicant: QUALCOMM Incorporated, San Diego, CA (US)

(72) Inventors: Ahmed Elshafie, San Diego, CA (US); Muhammad Sayed Khairy Abdelghaffar, San Jose, CA (US); Ahmed Attia Abotabl, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 420 days.

(21) Appl. No.: 17/550,782

(22) Filed: Dec. 14, 2021

(65) Prior Publication Data

US 2023/0188251 A1    Jun. 15, 2023

(51) Int. Cl.
| | |
|---|---|
| *H04L 1/00* | (2006.01) |
| *H04L 5/00* | (2006.01) |
| *H04W 72/0446* | (2023.01) |
| *H04W 72/1263* | (2023.01) |
| *H04W 72/23* | (2023.01) |

(52) U.S. Cl.
CPC .......... *H04L 1/0025* (2013.01); *H04L 5/0053* (2013.01); *H04W 72/0446* (2013.01); *H04W 72/1263* (2013.01); *H04W 72/23* (2023.01)

(58) Field of Classification Search
CPC ............. H04W 72/23; H04W 72/1263; H04W 72/543; H04W 72/0446; H04W 72/11; H04W 72/115; H04L 5/0053; H04L 1/0052; H04L 1/0017; Y02D 30/70
See application file for complete search history.

(56) References Cited

U.S. PATENT DOCUMENTS

| | | | |
|---|---|---|---|
| 9,949,222 B2* | 4/2018 | Langereis | H04W 56/0045 |
| 11,950,306 B2* | 4/2024 | Park | H04B 7/06968 |
| 2019/0296847 A1* | 9/2019 | Sun | H04L 5/0053 |
| 2019/0312693 A1* | 10/2019 | Belleschi | H04W 56/002 |
| 2020/0205165 A1* | 6/2020 | Huang | H04L 1/1854 |
| 2021/0258746 A1* | 8/2021 | Humbert | H04L 65/65 |
| 2022/0078863 A1* | 3/2022 | Gupta | G06F 9/54 |
| 2022/0094484 A1* | 3/2022 | Babaei | H04W 72/1263 |
| 2022/0272662 A1* | 8/2022 | Kim | H04W 72/23 |

(Continued)

*Primary Examiner* — Brian D Nguyen
(74) *Attorney, Agent, or Firm* — Holland & Hart LLP/Qualcomm Incorporated

(57) ABSTRACT

Methods, systems, and devices for wireless communications are described. A base station may identify that the base station is going to enter a communication state associated with a capability limitation where the base station does not support at least one communications application while operating in the communication state. The communication state may be a power saving mode. The base station may transmit a message to a user equipment (UE) indicating the capability limitation(s) associated with the communication state, and communicate with the UE according to the capability limitation(s). The base station may identify that the base station has scheduled communications with a UE in accordance with an SPS configuration or a configured grant. The base station may transmit a message to the UE indicating an update for the SPS configuration or the configured grant based on a capability limitation associated with the communication state.

30 Claims, 21 Drawing Sheets

(56) References Cited

U.S. PATENT DOCUMENTS

2022/0312337 A1\* 9/2022 Lim ..................... H04W 52/10
2022/0343760 A1\* 10/2022 Baek ..................... H04W 4/46
2023/0070233 A1\* 3/2023 Shrivastava .......... H04W 76/27
2024/0080854 A1\* 3/2024 Kim ..................... H04W 72/53

\* cited by examiner

COMMUNICATIONS STATE SWITCHING OF A BASE STATION

FIELD OF TECHNOLOGY

The following relates to wireless communications, including communications state switching of a base station.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support communications state switching of a base station (e.g., including energy saving mode switching for green communications). Generally, the described techniques provide for signaling to one or more user equipments (UEs) that the base station is entering a communication state associated with a capability limitation (e.g., where the base station does not support at least one communications application while operating in the communication state) and then communicating with the one or more UEs in the communication state. A base station may identify that the base station is going to enter a communication state, where the communication state is associated with a capability limitation of the network in which the network does not support at least one communications application while operating in the communication state. The communication state may be a power saving mode. For example, communications applications may include ultra-reliable low latency communications (URLLC) with a given delay requirement, URLLC with a given block error ratio, enhanced mobile broadband, or given QoS targets. The base station may transmit a message to a UE indicating the capability limitations of the base station associated with the communication state, and then communicate with the UE according to capability limitations.

In some examples, before or upon entering a communication state associated with a capability limitation, the base station may identify that the base station has scheduled communications with a UE in accordance with a semi-persistent scheduling (SPS) configuration or a configured grant. The base station may transmit a message to the UE indicating an update for the SPS configuration or the configured grant based on a capability limitation associated with the communications state. For example, the base station may transmit an indication to cancel one or more uplink transmissions scheduled according to the SPS configuration or one or more downlink transmissions scheduled according to the configured grant.

A method for wireless communications at a base station is described. The method may include identifying that the base station is transitioning to a communication state associated with a capability limitation in which the base station does not support at least one communications application while operating in the communication state, transmitting, to a UE, a message indicating the capability limitation, and communicating with the UE in the communication state based on the capability limitation.

An apparatus for wireless communications at a base station is described. The apparatus may include a processor, memory coupled with the processor, and instructions stored in the memory. The instructions may be executable by the processor to cause the apparatus to identify that the base station is transitioning to a communication state associated with a capability limitation in which the base station does not support at least one communications application while operating in the communication state, transmit, to a UE, a message indicating the capability limitation, and communicate with the UE in the communication state based on the capability limitation.

Another apparatus for wireless communications at a base station is described. The apparatus may include means for identifying that the base station is transitioning to a communication state associated with a capability limitation in which the base station does not support at least one communications application while operating in the communication state, means for transmitting, to a UE, a message indicating the capability limitation, and means for communicating with the UE in the communication state based on the capability limitation.

A non-transitory computer-readable medium storing code for wireless communications at a base station is described. The code may include instructions executable by a processor to identify that the base station is transitioning to a communication state associated with a capability limitation in which the base station does not support at least one communications application while operating in the communication state, transmit, to a UE, a message indicating the capability limitation, and communicate with the UE in the communication state based on the capability limitation.

Some examples of the method, apparatuses, and non-transitory computer-readable medium described herein may further include operations, features, means, or instructions for transmitting, to the UE, an indication of a set of multiple operating modes associated with a respective set of multiple capability limitations, where the communication state may be one of the set of multiple operating modes.

In some examples of the method, apparatuses, and non-transitory computer-readable medium described herein, transmitting the message indicating the capability limitation may include operations, features, means, or instructions for transmitting, with the message, an indication of the communication state, which may be a selected mode of the set of multiple operating modes.

In some examples of the method, apparatuses, and non-transitory computer-readable medium described herein, the set of multiple operating modes may be associated with support for URLLC with a first delay requirement, URLLC with a second delay requirement, URLLC with a first block error ratio, URLLC with a second block error ratio, enhanced mobile broadband, or a combination thereof.

Some examples of the method, apparatuses, and non-transitory computer-readable medium described herein may further include operations, features, means, or instructions for transmitting, to the UE, an indication of a respective resource allocation for the UE for communications in a sidelink mode for each of the set of multiple operating modes.

In some examples of the method, apparatuses, and non-transitory computer-readable medium described herein, each of the set of multiple operating modes is associated with a respective quality of service target of a set of multiple quality of service targets, and identifying that the base station may be transitioning to the communication state may include operations, features, means, or instructions for identifying a quality of service target associated with the communication state from the set of multiple quality of service targets.

Some examples of the method, apparatuses, and non-transitory computer-readable medium described herein may further include operations, features, means, or instructions for communicating with a set of multiple UEs, where the set of multiple UEs includes the UE and receiving, from each UE of the set of multiple UEs, communications metric feedback information, where each operating mode of the set of multiple operating modes may be associated with one of a set of multiple thresholds associated with a communications metric.

In some examples of the method, apparatuses, and non-transitory computer-readable medium described herein, a first mode of the set of multiple operating modes corresponds to an acknowledgement and negative acknowledgement mode, a second mode of the set of multiple operating modes corresponds to an acknowledgement only mode, a third mode of the set of multiple operating modes corresponds to a negative acknowledgement only mode, and a fourth mode of the set of multiple operating modes corresponds to a non-feedback mode.

Some examples of the method, apparatuses, and non-transitory computer-readable medium described herein may further include operations, features, means, or instructions for communicating with a set of multiple UEs, where the set of multiple UEs includes the UE, and where identifying that the base station may be transitioning to the communication state includes identifying that a threshold number of UEs of the set of multiple UEs may be associated with one or more communications metrics satisfying one or more thresholds.

In some examples of the method, apparatuses, and non-transitory computer-readable medium described herein, the one or more communications metrics include an estimated pathloss, a signal to interference and noise ratio, a reference signal received power, or a combination thereof.

Some examples of the method, apparatuses, and non-transitory computer-readable medium described herein may further include operations, features, means, or instructions for communicating with a set of multiple UEs, where the set of multiple UEs includes the UE and determining a power condition to maintain a quality of service target with the set of multiple UEs, and where identifying that the base station may be transitioning to the communication state may be based on the determined power condition.

In some examples of the method, apparatuses, and non-transitory computer-readable medium described herein, the communication state may be associated with an energy saving mode.

In some examples of the method, apparatuses, and non-transitory computer-readable medium described herein, transmitting the message may include operations, features, means, or instructions for transmitting the message via a downlink control information signal or a medium access control (MAC) control element (MAC-CE) signal.

Some examples of the method, apparatuses, and non-transitory computer-readable medium described herein may further include operations, features, means, or instructions for determining that the base station may have scheduled communications with the UE in accordance with an SPS configuration or a configured grant and transmitting, with the message, an indication of an update for the SPS configuration or the configured grant based on the capability limitation, and where communicating with the UE in the communication state based on the capability limitation includes communicating with the UE in accordance with the update for the semi-persistent scheduling configuration or the configured grant.

In some examples of the method, apparatuses, and non-transitory computer-readable medium described herein, the SPS configuration includes a set of multiple scheduled uplink transmissions or the configured grant includes a set of multiple scheduled downlink transmissions and transmitting the message may include operations, features, means, or instructions for transmitting an indication to cancel at least one of the set of multiple scheduled uplink transmissions or at least one of the set of multiple scheduled downlink transmissions.

In some examples of the method, apparatuses, and non-transitory computer-readable medium described herein, the communication state may be one of a set of multiple operating modes and each operating mode of the set of multiple operating modes is associated with a respective time domain resource allocation, a respective operating bandwidth, or a respective resource block allocation and the method, apparatuses, and non-transitory computer-readable medium may include further operations, features, means, or instructions for transmitting, with the message, an indication of the respective time domain resource allocation, the respective operating bandwidth, or the respective resource block allocation associated with the communication state.

A method for wireless communications at a UE is described. The method may include receiving, from a base station, a message indicating a capability limitation in which the base station does not support at least one communications application while operating in a communication state and communicating with the base station based on the capability limitation of the communication state.

An apparatus for wireless communications at a UE is described. The apparatus may include a processor, memory coupled with the processor, and instructions stored in the memory. The instructions may be executable by the processor to cause the apparatus to receive, from a base station, a message indicating a capability limitation in which the base station does not support at least one communications application while operating in a communication state and communicate with the base station based on the capability limitation of the communication state.

Another apparatus for wireless communications at a UE is described. The apparatus may include means for receiving, from a base station, a message indicating a capability limitation in which the base station does not support at least one communications application while operating in a communication state and means for communicating with the base station based on the capability limitation of the communication state.

A non-transitory computer-readable medium storing code for wireless communications at a UE is described. The code may include instructions executable by a processor to receive, from a base station, a message indicating a capability limitation in which the base station does not support at least one communications application while operating in a communication state and communicate with the base station based on the capability limitation of the communication state.

Some examples of the method, apparatuses, and non-transitory computer-readable medium described herein may further include operations, features, means, or instructions for receiving, from the base station, an indication of a set of multiple operating modes associated with a respective set of multiple capability limitations, where the communication state may be one of the set of multiple operating modes.

In some examples of the method, apparatuses, and non-transitory computer-readable medium described herein, receiving the message indicating the capability limitation may include operations, features, means, or instructions for receiving, with the message, an indication of the communication state, which may be a selected mode of the set of multiple operating modes.

In some examples of the method, apparatuses, and non-transitory computer-readable medium described herein, the set of multiple operating modes may be associated with an ability to support URLLC with a first delay requirement, URLLC with a second delay requirement, URLLC with a first block error ratio, URLLC with a second block error ratio, enhanced mobile broadband, or a combination thereof.

Some examples of the method, apparatuses, and non-transitory computer-readable medium described herein may further include operations, features, means, or instructions for receiving, from the base station, an indication of a respective resource allocation for the UE for communications in a sidelink mode for each of the set of multiple operating modes.

In some examples of the method, apparatuses, and non-transitory computer-readable medium described herein, a first mode of the set of multiple operating modes corresponds to an acknowledgement and negative acknowledgement mode, a second mode of the set of multiple operating modes corresponds to an acknowledgement only mode, a third mode of the set of multiple operating modes corresponds to a negative acknowledgement only mode, and a fourth mode of the set of multiple operating modes corresponds to a non-feedback mode.

In some examples of the method, apparatuses, and non-transitory computer-readable medium described herein, the communication state may be associated with an energy saving mode.

In some examples of the method, apparatuses, and non-transitory computer-readable medium described herein, receiving the message may include operations, features, means, or instructions for receiving the message via a DCI signal or a MAC-CE signal.

Some examples of the method, apparatuses, and non-transitory computer-readable medium described herein may further include operations, features, means, or instructions for receiving, from the base station, an SPS configuration or a configured grant and receiving, with the message, an update for the SPS configuration or the configured grant based on the capability limitation, where communicating with the base station based on the capability limitation of the communication state includes communicating with the base station in accordance with the update for the semi-persistent scheduling configuration or the configured grant.

In some examples of the method, apparatuses, and non-transitory computer-readable medium described herein, the SPS configuration includes a set of multiple scheduled uplink transmissions or the configured grant includes a set of multiple scheduled downlink transmissions and receiving the message may include operations, features, means, or instructions for receiving an indication to cancel at least one of the set of multiple scheduled uplink transmissions or at least one of the set of multiple scheduled downlink transmissions.

In some examples of the method, apparatuses, and non-transitory computer-readable medium described herein, the communication state may be one of a set of multiple operating modes and each operating mode of the set of multiple operating modes is associated with a respective time domain resource allocation, a respective operating bandwidth, or a respective resource block allocation, and the method, apparatuses, and non-transitory computer-readable medium may include further operations, features, means, or instructions for receiving, with the message, an indication of the respective time domain resource allocation, the respective operating bandwidth, or the respective resource block allocation associated with the communication state.

A method for wireless communications at a base station is described. The method may include identifying that the base station is transitioning to a communication state associated with a capability limitation in which the base station does not support at least one communications application while operating in the communication state, determining that the base station has scheduled communications with a UE in accordance with an SPS configuration or a configured grant, transmitting, to the UE, a message indicating an update for the SPS configuration or the configured grant based on the capability limitation, and communicating with the UE in accordance with the update for the SPS configuration or the configured grant.

An apparatus for wireless communications at a base station is described. The apparatus may include a processor, memory coupled with the processor, and instructions stored in the memory. The instructions may be executable by the processor to cause the apparatus to identify that the base station is transitioning to a communication state associated with a capability limitation in which the base station does not support at least one communications application while operating in the communication state, determine that the base station has scheduled communications with a UE in accordance with an SPS configuration or a configured grant, transmit, to the UE, a message indicating an update for the SPS configuration or the configured grant based on the capability limitation, and communicate with the UE in accordance with the update for the SPS configuration or the configured grant.

Another apparatus for wireless communications at a base station is described. The apparatus may include means for identifying that the base station is transitioning to a communication state associated with a capability limitation in which the base station does not support at least one communications application while operating in the communication state, means for determining that the base station has scheduled communications with a UE in accordance with an SPS configuration or a configured grant, means for transmitting, to the UE, a message indicating an update for the SPS configuration or the configured grant based on the capability, and means for communicating with the UE in accordance with the update for the SPS configuration or the configured grant.

A non-transitory computer-readable medium storing code for wireless communications at a base station is described. The code may include instructions executable by a processor to identify that the base station is transitioning to a communication state associated with a capability limitation in which the base station does not support at least one communications application while operating in the communication state, determine that the base station has scheduled communications with a UE in accordance with an SPS configuration or a configured grant, transmit, to the UE, a message indicating an update for the SPS configuration or the configured grant based on the capability limitation, and communicate with the UE in accordance with the update for the SPS configuration or the configured grant.

In some examples of the method, apparatuses, and non-transitory computer-readable medium described herein, the SPS configuration includes a set of multiple scheduled uplink transmissions or the configured grant includes a set of multiple scheduled downlink transmissions and transmitting the message may include operations, features, means, or instructions for transmitting an indication to cancel at least one of the set of multiple scheduled uplink transmissions or at least one of the set of multiple scheduled downlink transmissions.

In some examples of the method, apparatuses, and non-transitory computer-readable medium described herein, the communication state may be one of a set of multiple operating modes and each operating mode of the set of multiple operating modes is associated with a respective time domain resource allocation and the method, apparatuses, and non-transitory computer-readable medium may include further operations, features, means, or instructions for transmitting, with the message, an indication of the respective time domain resource allocation associated with the communication state.

In some examples of the method, apparatuses, and non-transitory computer-readable medium described herein, the communication state may be one of a set of multiple operating modes and each operating mode of the set of multiple operating modes is associated with a respective operating bandwidth or a respective resource block allocation and the method, apparatuses, and non-transitory computer-readable medium may include further operations, features, means, or instructions for transmitting, with the message, an indication of the respective operating bandwidth or the respective resource block allocation associated with the communication state.

In some examples of the method, apparatuses, and non-transitory computer-readable medium described herein, the communication state may be one of a set of multiple operating modes and each operating mode of the set of multiple operating modes is associated with a respective set of beams, a respective modulation and coding scheme, a respective rank, or a combination thereof and the method, apparatuses, and non-transitory computer-readable medium may include further operations, features, means, or instructions for transmitting, with the message, an indication of the respective set of beams, the respective modulation and coding scheme, the respective rank, or combination thereof associated with the communication state.

In some examples of the method, apparatuses, and non-transitory computer-readable medium described herein, transmitting the message may include operations, features, means, or instructions for transmitting the message via a radio resource control signal or via a medium access control (MAC) control element (CE).

In some examples of the method, apparatuses, and non-transitory computer-readable medium described herein, the semi-persistent scheduling configuration or the configured grant is associated with a first periodicity, and transmitting the message may include operations, features, means, or instructions for transmitting with the message an indication of a second periodicity that may be longer than the first periodicity, and where communicating with the UE in accordance with the update includes communicating with the UE in accordance with the second periodicity.

In some examples of the method, apparatuses, and non-transitory computer-readable medium described herein, the SPS configuration includes a set of multiple SPS indices associated with a set of multiple communications applications, where the set of multiple communications applications includes the at least one communications application and the method, apparatuses, and non-transitory computer-readable medium may include further operations, features, means, or instructions for transmitting, with the message, an indication to deactivate an SPS index of the set of multiple SPS indices associated with the at least one communications application.

In some examples of the method, apparatuses, and non-transitory computer-readable medium described herein, the communication state may be associated with an energy saving mode.

In some examples of the method, apparatuses, and non-transitory computer-readable medium described herein, transmitting the message may include operations, features, means, or instructions for transmitting the message via a DCI signal or a MAC-CE signal.

A method for wireless communications at a UE is described. The method may include receiving, from a base station, an SPS configuration or a configured grant, receiving, from the base station, a message indicating an update for the SPS configuration or the configured grant based on a capability limitation in which the base station does not support at least one communications application while operating in a communication state, and communicating with the base station in accordance with the update for the SPS configuration or the configured grant.

An apparatus for wireless communications at a UE is described. The apparatus may include a processor, memory coupled with the processor, and instructions stored in the memory. The instructions may be executable by the processor to cause the apparatus to receive, from a base station, an SPS configuration or a configured grant, receive, from the base station, a message indicating an update for the SPS configuration or the configured grant based on a capability limitation in which the base station does not support at least one communications application while operating in a communication state, and communicate with the base station in accordance with the update for the SPS configuration or the configured grant.

Another apparatus for wireless communications at a UE is described. The apparatus may include means for receiving, from a base station, an SPS configuration or a configured grant, means for receiving, from the base station, a message indicating an update for the SPS configuration or the configured grant based on a capability limitation in which the base station does not support at least one communications application while operating in a communication state, and means for communicating with the base station in accordance with the update for the SPS configuration or the configured grant.

A non-transitory computer-readable medium storing code for wireless communications at a UE is described. The code may include instructions executable by a processor to receive, from a base station, an SPS configuration or a configured grant, receive, from the base station, a message indicating an update for the SPS configuration or the configured grant based on a capability limitation in which the base station does not support at least one communications application while operating in a communication state, and communicate with the base station in accordance with the update for the SPS configuration or the configured grant.

In some examples of the method, apparatuses, and non-transitory computer-readable medium described herein, the SPS configuration includes a set of multiple scheduled uplink transmissions or the configured grant includes a set of multiple scheduled downlink transmissions, and receiving the message may include operations, features, means, or instructions for receiving an indication to cancel at least one of the set of multiple scheduled uplink transmissions or at least one of the set of multiple scheduled downlink transmissions.

In some examples of the method, apparatuses, and non-transitory computer-readable medium described herein, the communication state may be one of a set of multiple operating modes and each operating mode of the set of multiple operating modes is associated with a respective time domain resource allocation and the method, apparatuses, and non-transitory computer-readable medium may include further operations, features, means, or instructions for receiving, with the message, an indication of the respective time domain resource allocation associated with the communication state.

In some examples of the method, apparatuses, and non-transitory computer-readable medium described herein, the communication state may be one of a set of multiple operating modes and each operating mode of the set of multiple operating modes is associated with a respective operating bandwidth or a respective resource block allocation and the method, apparatuses, and non-transitory computer-readable medium may include further operations, features, means, or instructions for receiving, with the message, an indication of the respective operating bandwidth or the respective resource block allocation associated with the communication state.

In some examples of the method, apparatuses, and non-transitory computer-readable medium described herein, the communication state may be one of a set of multiple operating modes and each operating mode of the set of multiple operating modes is associated with a respective set of beams, a respective modulation and coding scheme, a respective rank, or a combination thereof and the method, apparatuses, and non-transitory computer-readable medium may include further operations, features, means, or instructions for transmitting, with the message, an indication of the respective set of beams, the respective modulation and coding scheme, the respective rank, or combination thereof associated with the communication state.

In some examples of the method, apparatuses, and non-transitory computer-readable medium described herein, the communication state may be associated with an energy saving mode.

In some examples of the method, apparatuses, and non-transitory computer-readable medium described herein, receiving the message may include operations, features, means, or instructions for receiving the message via a DCI signal or a MAC-CE signal.

DETAILED DESCRIPTION

Figure 1:
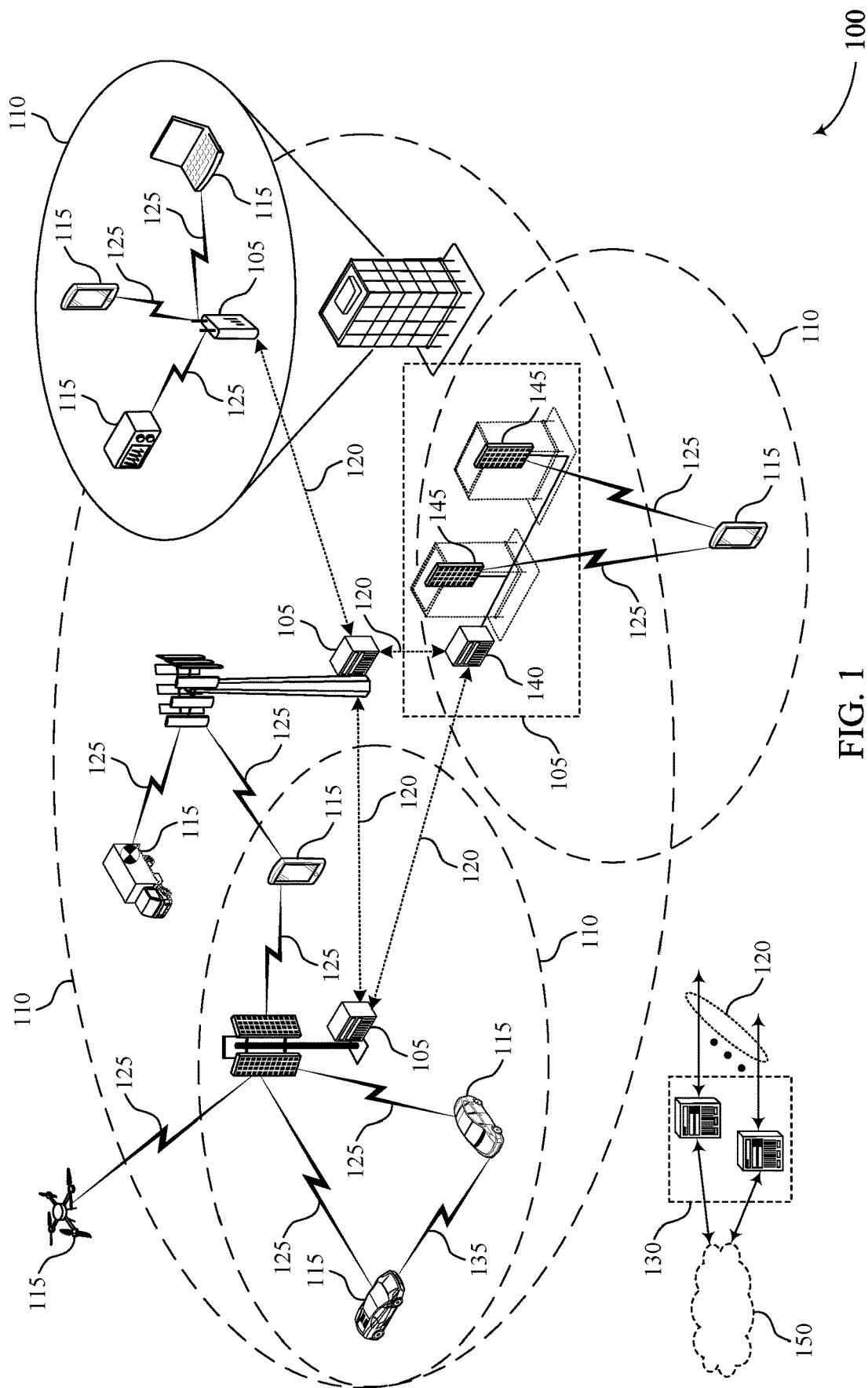
FIG. 1 illustrates an example of a wireless communications system that supports communications state switching of a base station in accordance with aspects of the present disclosure.

In some wireless communications systems, network nodes such as base stations may operate in different modes to reduce power consumption and maintain network operations. For example, different modes may be associated with different operating bandwidths, antenna adaptations, and signaling. For example, in some operating modes, a base station may limit or reduce the transmission of always-on periodic signals such as system information block (SIB) resources. A base station may change modes based on network conditions, such as quality of service (QoS) targets associated with user equipments (UEs) communicating with the base station. When operating in some power saving modes, the base station may be unable to support some communications applications. Further some power saving modes may be unable to support communications scheduled according to semi-persistent scheduling (SPS) configurations or configured grants that were scheduled prior to the base station entering the power saving mode. UEs communicating with the base station may be unaware of limitations of the base station operating in a power saving mode.

A base station may signal to one or more UEs that the base station is entering a communication state associated with a capability limitation (e.g., where the base station does not support at least one communications application while operating in the communication state) and then communicate with the one or more UEs in the communication state. A base station may identify that the base station is going to enter a communication state, where the communication state is associated with a capability limitation of the network in which the network does not support at least one communications application while operating in the communication state. The communication state may be a power saving mode. For example, communications applications may include ultra-reliable low latency communications (URLLC) with a given delay requirement, URLLC with a given block error ratio, enhanced mobile broadband, or given QoS targets. The base station may transmit a message to a UE indicating the capability limitations of the base station associated with the communication state, and then communicate with the UE according to capability limitations. The base station may transmit the capability message using layer 1 or layer 2 signaling such as via a downlink control information (DCI) message or via a MAC control element (MAC-CE).

In some examples, the base station may indicate a plurality of operating modes (e.g., communications states) to the UEs communicating with the base station. The base station may also indicate a set of respective capability limitations associated with each operating mode. The base station may indicate to the UEs when the base station is going to enter a given operating mode, and communicate with the UEs according to the given mode.

In some examples, before or upon entering a communication state associated with a capability limitation in which the base station does not support at least one communications application, the base station may identify that the base station has scheduled communications with a UE in accordance with an SPS configuration or a configured grant. The base station may transmit a message to the UE indicating an update for the SPS configuration or the configured grant based on a capability limitation associated with the communication state. For example, the base station may transmit an indication to cancel one or more uplink transmissions scheduled according to the SPS configuration or one or more downlink transmissions scheduled according to the configured grant.

Aspects of the disclosure are initially described in the context of wireless communications systems. Aspects of the disclosure are further illustrated by and described with reference to block diagrams and process flows. Aspects of the disclosure are further illustrated by and described with reference to apparatus diagrams, system diagrams, and flowcharts that relate to communications state switching of a base station (e.g., including energy saving mode switching for green communications).

FIG. 1 illustrates an example of a wireless communications system 100 that supports communications state switching of a base station in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support URLLC. The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a base station 105 may operate in different modes to reduce power consumption and maintain network operations. For example, different modes may be associated with different operating bandwidths, antenna adaptations, and signaling. For example, in some operating modes, a base station 105 may limit or reduce the transmission of always-on periodic signals such as SIB resources. A base station 105 may change modes based on network conditions, such as QoS targets associated with UEs 115 communicating with the base station 105. When operating in some power saving modes, the base station 105 may be unable to support some communications applications. Further some power saving modes may be unable to support communications scheduled according to SPS configurations or configured grants that were scheduled prior to the base station 105 entering the power saving mode. UEs 115 communicating with the base station 105 may be unaware of limitations of the base station 105 operating in the power saving mode.

A base station 105 may signal to one or more UEs 115 that the base station 105 is entering a communication state in which the base station 105 does not support at least one communications application while operating in the communication state and then the base station 105 may communicate with the one or more UEs 115 in the communication state. A base station 105 may identify that the base station 105 is going to enter a communication state, where the network does not support at least one communications application while the base station is operating in the communication state. The communication state may be a power saving mode. For example, communications applications may include URLLC with a given delay requirement, URLLC with a given block error ratio, enhanced mobile broadband, or given QoS targets. The base station 105 may transmit a message to a UE 115 indicating the capability limitations of the base station 105 associated with the communication state, and then communicate with the UE 115 according to capability limitations. In some examples, the base station 105 may transmit the message indicating the capability limitations of the base station 105 using layer 1 or layer 2 signaling such as via a DCI message or via a MAC-CE.

In some examples, the base station 105 may indicate a plurality of operating modes to the UEs 115 communicating with the base station 105. The base station 105 may also indicate a set of respective capability limitations associated with each operating mode. In some examples, the base station 105 may transmit a message indicating the plurality of operating modes and the set of respective capability limitations associated with each operating mode using layer 1 or layer 2 signaling such as via a DCI message or via a MAC-CE. The base station 105 may indicate to the UEs 115 when the base station 105 is going to enter a given operating mode, and communicate with the UEs 115 according to the given mode. In some examples, the base station 105 may transmit the indication that the base station 105 is going to enter a given operating mode using layer 1 or layer 2 signaling such as via a DCI message or via a MAC-CE.

In some examples, before or upon entering a communication state in which the base station 105 does not support at least one communications application, the base station 105 may identify that the base station 105 has scheduled communications with a UE 115 in accordance with an SPS configuration or a configured grant. The base station 105 may transmit a message to the UE 115 indicating an update for the SPS configuration or the configured grant based on a capability limitation associated with the communication state. In some examples, the base station may transmit the message using layer 1 or layer 2 signaling such as via a DCI message or via a MAC-CE. For example, the base station 105 may transmit an indication to cancel one or more uplink transmissions scheduled according to the SPS configuration or one or more downlink transmissions scheduled according to the configured grant.

Figure 2:
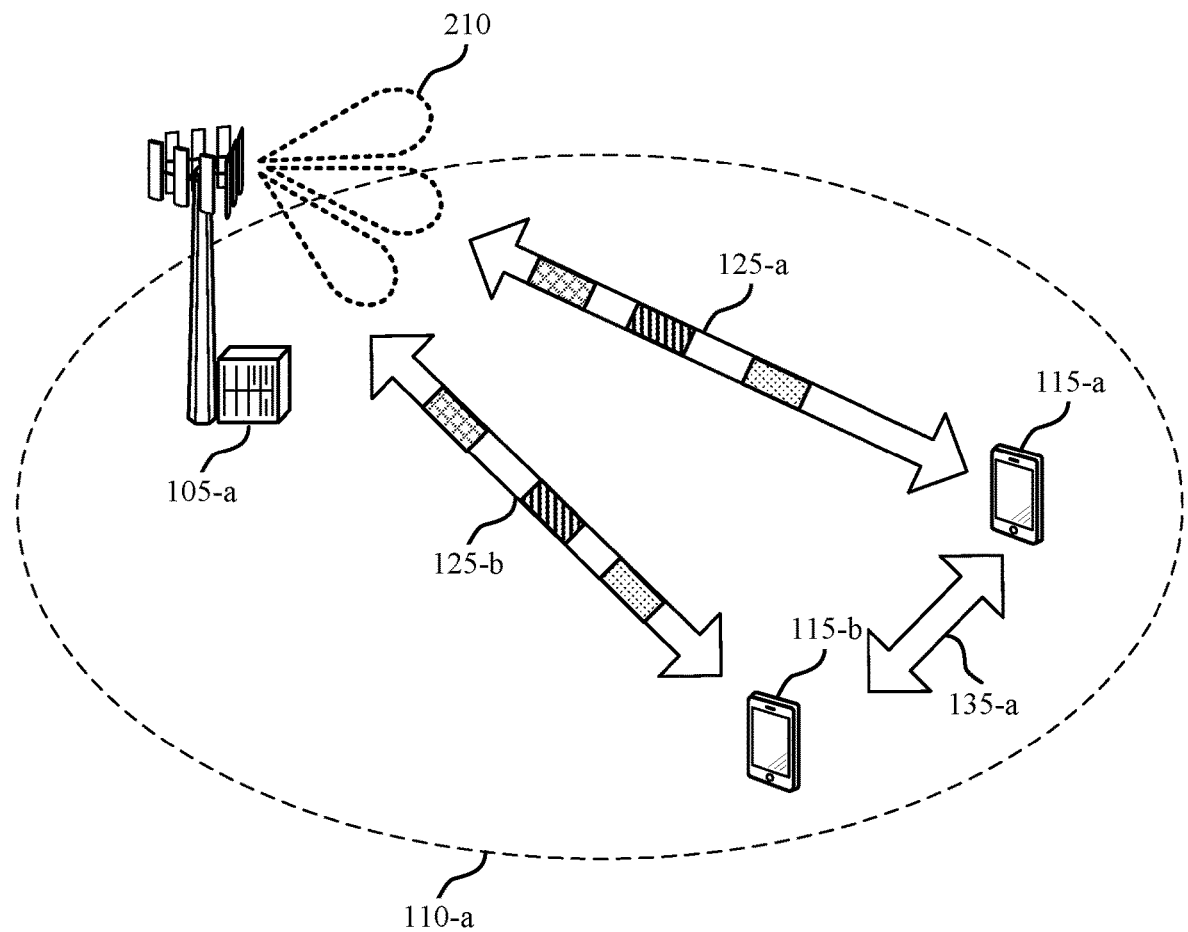
FIG. 2 illustrates an example of a wireless communications system that supports communications state switching of a base station in accordance with aspects of the present disclosure.

FIG. 2 illustrates an example of a wireless communications system 200 that supports communications state switching of a base station in accordance with aspects of the present disclosure. In some examples, the wireless communications system 200 may implement aspects of wireless communications system 100. The wireless communications system 200 may include UEs 115-a and 115-b, which may be examples of UEs 115 as described herein. The wireless communications system 200 may include a base station 105-a, which may be an example of a base station 105 as described herein.

The first UE 115-a and the second UE 115-b within a geographic coverage area 110-a of the base station 105-a may communicate with the base station 105-a using a communication link 125-a and a communication link 125-b, respectively, which may be examples of NR or LTE links between the first UE 115-a and the second UE 115-b, respectively, and the base station 105-a. In some cases, the communication link 125-a and the communication link 125-b may include examples of access links (e.g., Uu links).

The communication link 125-a and communication link 125-b may include bi-directional links that enable both uplink and downlink communication. For example, the first UE 115-a may transmit uplink signals, such as uplink control signals or uplink data signals, to the base station 105-a using the first communication link 125-a and the base station 105-a may transmit downlink signals, such as downlink control signals or downlink data signals, to the first UE 115-a using the communication link 125-a. By way of another example, the second UE 115-b may transmit uplink signals, such as uplink control signals or uplink data signals, to the base station 105-a using the first communication link 125-b and the base station 105-a may transmit downlink signals, such as downlink control signals or downlink data signals, to the second UE 115-b using the communication link 125-b.

In some examples, the base station 105-a may communicate with the UE 115-a or the UE 115-b using directional communications techniques. For example, the base station 105-a may communicate with the UE 115-a or the UE 115-b via one or more beams 210.

The first UE 115-a and the second UE 115-b may communicate via a sidelink communication link 135-a. The sidelink communication link 135-a may include bi-directional links that enable both uplink and downlink communication. In some examples, the base station 105-a may configure resources for the sidelink communication link 135-a.

The base station 105-a may identify that the base station 105-a is going to enter a communication state in which the base station 105-a does not support at least one communications application. The communication state may be a power saving mode. For example, communications applications may include URLLC with a given delay requirement, URLLC with a given block error ratio, enhanced mobile broadband, or given QoS targets. In some examples, the communications application may be an ability or inability to provide resource allocations for sidelink mode 1 communications between the UE 115-a and the UE 115-b. The base station 105 may transmit a capability message 215 to the UE 115-a and the UE 115-b indicating the capability limitations of the base station 105 associated with the communication state. The base station 105-a may transmit the capability message using layer 1 or layer 2 signaling such as via a DCI message or via a MAC-CE. The base station 105-a may communicate (e.g., exchange communications 225) with the UE 115-a and the UE 115-b according to capability limitations associated with the communications state.

In some examples, the UEs 115-a and 115-b may provide communications metric feedback information 220 to the base station, such as an estimated pathloss, SNR, or QoS metric associated with the respective communications links 125-a and 125-b. In some examples, the UEs 115-a and 115-b may provide the communications metric feedback information 220 periodically. The base station 105-a may trigger entering into a power saving mode based on the communications metric feedback information 220. For example, the base station 105-a may be configured with thresholds for the pathloss, SINR, or QoS for a direct link 125. If a UE 115 reports a communications metric that satisfies the configured threshold, the base station 105-a may trigger entering into a power saving mode. In some examples, the base station 105-a may communicate with a plurality of UEs 115 which may provide communications metric feedback to the base station 105-a. In some examples, the base station 105-a may trigger entering into a power saving mode if a threshold number of UEs 115 reports communications metrics that satisfy a configured threshold. In some examples, the base station 105-a may be configured with multiple operating modes that are associated with a number of configured thresholds.

In some examples, the base station 105-a may identify a power condition to maintain a QoS target with the plurality of UEs 115 communicating with the base station 105-a. The base station 105-a may trigger entering into an energy saving mode based on the identified power condition. For example, the base station 105-a may be configured with a threshold power condition associated with an energy saving mode, and the base station 105-a may trigger entering into the energy saving mode when the identified power condition satisfies the threshold power condition. In some examples, a plurality of operating modes may be associated with a plurality of power condition thresholds, and the base station 105-a may enter a given operating mode based on the identified power condition.

In some examples, the base station 105-a may indicate a plurality of operating modes to the UE 115-a and the UE 115-b. The base station 105-a may also indicate a set of respective capability limitations associated with each operating mode. The base station 105-a may indicate to the UE 115-a and the UE 115-b when the base station 105-a is going to enter a given operating mode via a capability message 215, and communicate with the UEs 115 according to the given mode. In some examples, the operating modes may correspond to a type of feedback (e.g., HARQ) for the communications 225. For example, one operating mode may be associated with HARQ feedback (e.g., acknowledgement and negative acknowledgement), one operating mode may be associated with acknowledgment only feedback, one operating mode may be associated with negative acknowledgment only feedback, and one operating mode may be associated with no feedback (e.g., a non-feedback mode).

In some examples, the base station 105-a may indicate to the UE 115-a and the UE 115-b a resource allocation for the sidelink communication link 135-a associated with each of the plurality of operating modes. In some examples, the base station 105-a may indicate to the UE 115-a and the UE 115-b the ability of the base station 105-a to provide a resource allocation for the sidelink communication link 135-a while the base station 105-a is operating in each of the plurality of operating modes. In some examples, the ability to provide a resource allocation for the sidelink communication link 135-a while the base station 105-a is operating in each of the plurality of operating modes is indicated per resource pool.

In some examples, before or upon entering a communication state in which the base station 105 does not support at least one communications application, the base station 105-a may identify that the base station 105 has scheduled communications with a UE 115-a in accordance with an SPS configuration or a configured grant. The base station 105-a may transmit a capability message 215 to the UE 115-a indicating an update for the SPS configuration or the configured grant based on a capability limitation associated with the communication state. For example, the base station 105-a may transmit in the capability message 215 an indication to cancel one or more uplink transmissions scheduled according to the SPS configuration or one or more downlink transmissions scheduled according to the configured grant. In some examples, the base station 105 may transmit the capability message 215 using layer 1 or layer 2 signaling such as via a DCI message or via a MAC-CE. The base station 105-a and the UE 115-a may communicate in accordance with the update for the SPS configuration or the configured grant.

In some examples, the SPS configuration or the configured grant may be associated with a first periodicity. The base station 105-*a* may transmit, with the capability message 215, an indication of a second periodicity that is longer than the first periodicity. The base station 105-*a* and the UE 115-*a* may communicate in accordance with the second periodicity.

In some examples, the SPS configuration may include a set of SPS indices associated with a set of communications applications. In some examples, the SPS indices may be associated with communications applications using a given priority (e.g., SPS priority may be configured by radio resource control (RRC) to be high or low). The base station 105-*a* may transmit, with the capability message 215, an indication to deactivate the SPS index associated with the communications application that the base station 105-*a* is unable to support in the communication state. In some examples, the base station 105-*a* may transmit, with the capability message 215, an indication to deactivate an SPS index if the base station 105-*a* cannot support the QoS associated with the SPS index in the communication state.

In some examples, some activated SPS configurations or configured grants may be turned off or deactivated or canceled without DCI once the communication state is activated. The base station 105-*a* may indicate which activated SPS configurations or configured grants are turned off or deactivated or canceled in the capability message 215. In some examples, the communication state may be one of a plurality of operating modes which may each be associated with respective SPS configurations or configured grants being active or inactive. The base station 105-*a* may transmit, with the capability message 215, an indication of the respective SPS configurations or configured grants that are active or inactive based on the communication state.

In some examples, the communication state may be one of a plurality of operating modes which may each be associated with a respective time domain resource allocation. The base station 105-*a* may transmit, with the capability message 215, an indication of a respective time domain resource allocation associated with the communication state, and the base station 105-*a* and the UE 115-*a* may communicate in accordance with the time domain resource allocation associated with the communication state.

In some examples, the communication state may be one of a plurality of operating modes which may each be associated with a respective operating bandwidth or a respective resource block allocation. The base station 105-*a* may transmit, with the capability message 215, an indication of a respective operating bandwidth or a respective resource block allocation associated with the communication state, and the base station 105-*a* and the UE 115-*a* may communicate in accordance with the operating bandwidth or a respective resource block allocation associated with the communication state.

In some examples, the communication state may be one of a plurality of operating modes which may each be associated with a respective set of beams 210, a respective modulation and coding scheme (MCS), or a respective rank. The base station 105-*a* may transmit, with the capability message 215, an indication of a respective set of beams, a respective MCS, or a rank associated with the communication state, and the base station 105-*a* and the UE 115-*a* may communicate in accordance with the operating bandwidth or a respective resource block allocation associated with the communication state.

In some examples, the communication state may be one of a plurality of operating modes which may each be associated with a respective periodicity associated with an SPS configuration. Each operating mode of the plurality of operating modes may further be associated with a priority for the respective SPS configuration. The base station 105-*a* may transmit, with the capability message 215, an indication of a respective periodicity associated with the SPS configuration, and the base station 105-*a* and the UE 115-*a* may communicate in accordance with periodicity associated with the SPS configuration with the communication state.

Figure 3:
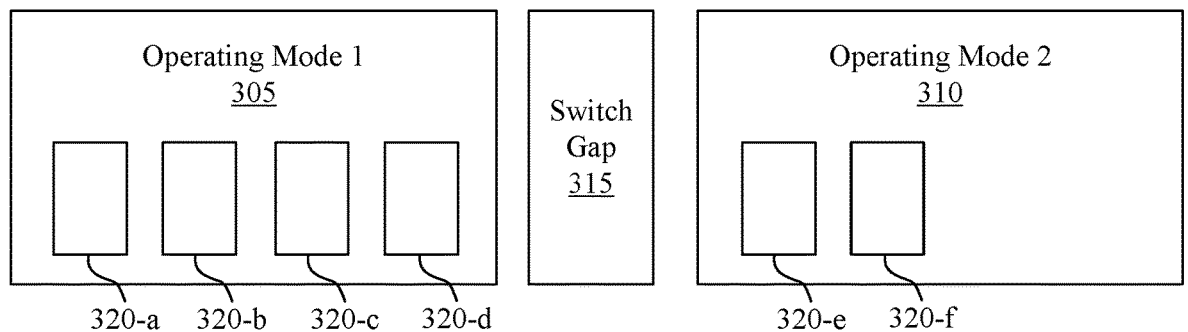
FIG. 3 illustrates an example of a block diagram that supports communications state switching of a base station in accordance with aspects of the present disclosure.

FIG. 3 illustrates an example of a block diagram 300 that supports communications state switching of a base station in accordance with aspects of the present disclosure. A base station 105 may operate in a number of operating modes based on a number of UEs 115 demanding a threshold amount of power 320 to maintain a QoS target for each UE 115. For example, the base station 105 may operate in a higher power operating mode 305 if the base station 105 detects that four UEs 115 demand a threshold amount of power 320 to satisfy the QoS target for each of the four UEs 115. The base station 105 may detect that two UEs 115 demand a threshold amount of power 320 to maintain a QoS target for each UE 115, for example, because two of the four UEs 115 may have left the coverage area of the base station 105 or because two of the four UEs 115 may have a changed (e.g., lower) QoS target. The base station 105 may switch to a lower power operating mode 310 based on detecting that two UEs 115 demand a threshold amount of power 320 to satisfy the QoS target for each of the two UEs 115. A switch gap 315 may represent the time for the base station 105 to transition from the first operating mode 305 to the second operating mode. In some examples, the base station 105 may communicate to the two UEs 115 that the base station 105 is switching to the operating mode 310. In some examples, the operating mode 310 may be associated with an inability of the base station 105 to support at least one communications application, and the base station 105 may indicate to the UEs 115 that the base station 105 is unable to support the at least one communications application.

Figure 4:
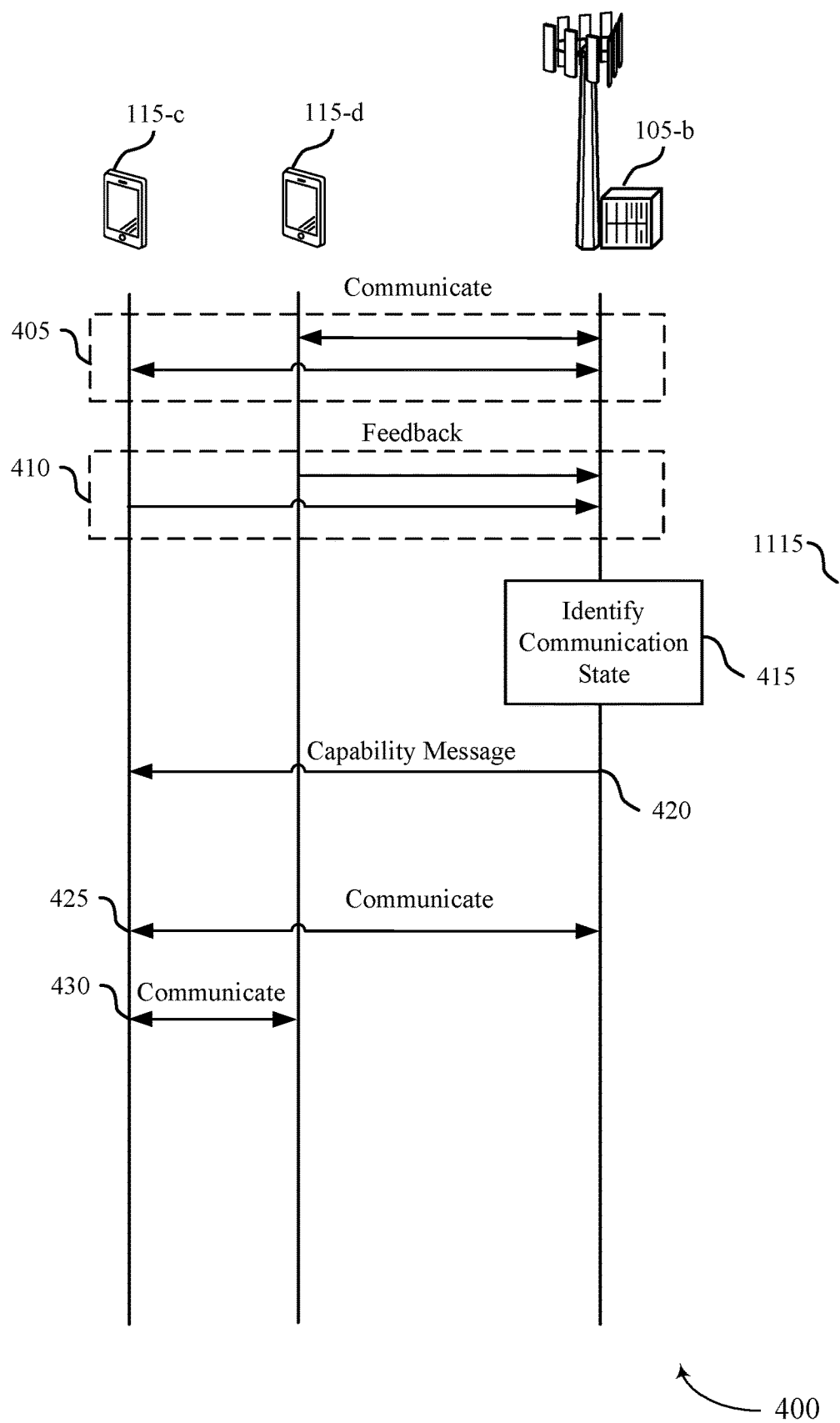
FIG. 4 illustrates an example of a process flow that supports communications state switching of a base station in accordance with aspects of the present disclosure.

FIG. 4 illustrates an example of a process flow 400 that supports communications state switching of a base station in accordance with aspects of the present disclosure. In some examples, the process flow 400 may be implemented by or may implement aspects of the wireless communications system 100 or 200. The process flow 400 may include a UE 115-*c* and a UE 115-*d* which may be examples of a UE 115 as described herein. The process flow 400 may also include a base station 105-*b* which may be an example of the base station 105 as described herein. In the following description of the process flow 400, the operations between the base station 105-*b*, the UE 115-*c*, and the UE 115-*d* may be transmitted in a different order than the example order shown, or the operations performed by the base station 105-*b*, the UE 115-*c*, and the UE 115-*d* may be performed in different orders or at different times. Some operations may also be omitted from the process flow 400, and other operations may be added to the process flow 400.

At 405, the base station 105-*b* may communicate with the UE 115-*c* and the UE 115-*d*. In some examples, the base station 105-*b* may communicate with a plurality of UEs including the UE 115-*c* and the UE 115-*d*. In some examples, the base station 105-*b* may transmit, to the UE 115-*c* and the UE 115-*d*, an indication of a set of operating modes associated with a respective set of capability limitations of the base station 105-*b* in which the base station 105-*b* does not support at least one communications application while in the respective operating mode. For example, communications applications may include URLLC with a given delay requirement, URLLC with a given block error ratio, enhanced mobile broadband, or given QoS targets.

At 410, the UE 115-c and the UE 115-d may provide communications metrics feedback information to the base station 105-b. For example, the UE 115-c and the UE 115-d may provide estimated pathloss, SNR, of QoS information associated with the communications between the base station 105-b and the respective UE 115-c and UE 115-d. In some examples, where the base station 105-b communicates with a plurality of UEs 115 including the UE 115-c and the UE 115-d, the plurality of UEs 115 may provide communications metrics feedback information to the base station 105-b.

At 415, the base station 105-b may identify the base station 105-b is transitioning to a communication state associated with a capability limitation of the base station 105-b in which the base station 105-b does not support at least one communications application while operating in the communication state. In some examples, the communication state may be one of a set of operating modes associated with a respective set of capability limitations of the base station 105-b. In some examples, the set of operating modes may be associated with associated with an ability to support URLLC with a first delay requirement, URLLC with a second delay requirement, URLLC with a first block error ratio URLLC with a second block error ratio, enhanced mobile broadband, or a combination thereof. In some examples, a first operating mode corresponds to an acknowledgment and negative acknowledgment feedback mode, a second operating mode corresponds to an acknowledgment only feedback mode, a third operating mode corresponds to a negative acknowledgment only feedback mode, and a fourth operating mode corresponds to a non-feedback mode.

In some examples, each of the set of operating modes is associated with a respective QoS target of a set of QoS targets, and the base station 105-b identifies that the base station 105-b is transitioning to the communication state based on identifying a QoS target associated with the communication state from the set of QoS targets.

In some examples, each operating mode of the set of operating modes is associated with one of a set of thresholds associated with a communications metric. In some examples, the base station 105-b may identify that the base station 105-b is transitioning to the communication state based on identifying that a threshold number of UEs 115 communication with the base station 105-b are associated with one or more communications metrics satisfying one or more thresholds. In some examples, the base station 105-b may identify that the base station 105-b is transitioning to the communication state based on determining a power condition to maintain a QoS with the set of UEs 115 communicating with the base station 105-b.

At 420, the base station 105-b may transmit, to the UE 115-c, a capability message indicating the capability limitation of the base station 105-b. In some examples, the base station 105-b may transmit the capability message via layer 1 or layer 2 signaling such as via a MAC-CE message or a DCI message. In some examples, where the base station 105-b transmitted an indication of a set of operating modes associated with a respective set of capability limitations of the base station 105-b, the capability message may indicate that the communication state is the selected mode of the set of operating modes. In some examples, the base station 105-b may indicate with the capability message a respective resource allocation for the UE 115-c for communications in a sidelink mode for each of the set of operating modes.

At 425, the base station 105-b may communicate with the UE 115-c in accordance with the capability limitation of the base station 105-b operating in the communication state. At 430, the UE 115-c and the UE 115-d may communicate via a sidelink communication link in accordance with a resource allocation indicated in the capability message.

In some examples, at 415, the base station 105-b may determine that the base station 105-b has scheduled communications with the UE 115-c in accordance with an SPS configuration or a configured grant. The base station 105-b may transmit, with the message at 420, an indication of an update for the SPS configuration or the configured grant based at least in part on the capability limitation. The base station 105-b and the UE 115-c may communicate in accordance with the update for the SPS configuration or the configured grant. In some examples, the SPS configuration includes a set of scheduled uplink transmissions or the configured grant includes a set of scheduled downlink transmissions, and transmitting the message at 420 includes transmitting and indication to cancel at least one of the set of scheduled uplink transmissions or at least one of the set of scheduled downlink transmissions. In some examples, the communication state is one of a set of operating modes, each operating mode of the set of operating modes is associated with a respective time domain resource allocation, a respective operating bandwidth, or a respective resource block allocation, and transmitting the message at 420 includes transmitting, with the message, an indication of the respective time domain resource allocation, the respective operating bandwidth, or the respective resource block allocation associated with the communication state.

Figure 5:
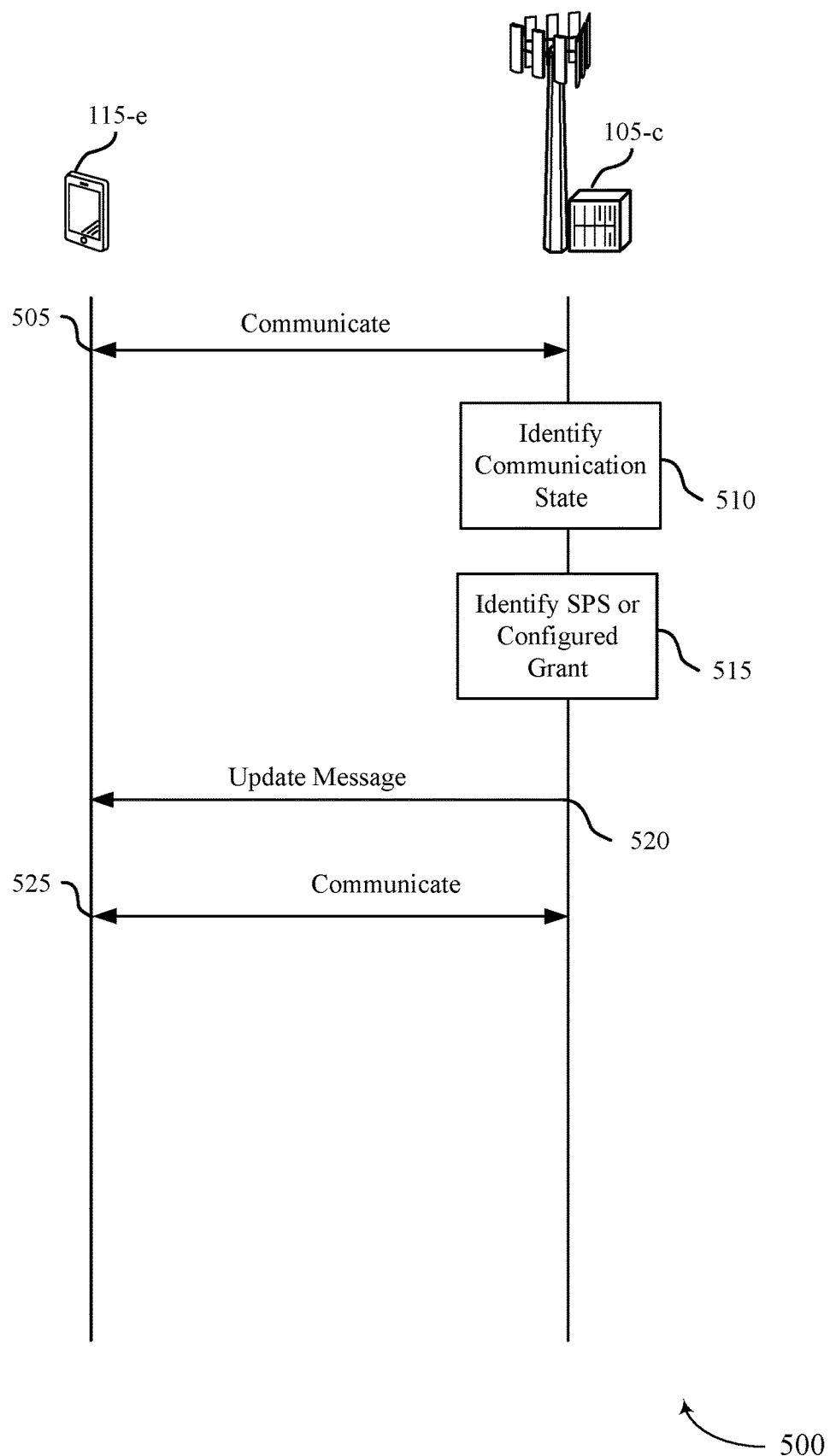
FIG. 5 illustrates an example of a process flow that supports communications state switching of a base station in accordance with aspects of the present disclosure.

FIG. 5 illustrates an example of a process flow 500 that supports communications state switching of a base station in accordance with aspects of the present disclosure. In some examples, the process flow 500 may be implemented by or may implement aspects of the wireless communications system 100 or 200. The process flow 500 may include a UE 115-e which may be an example of a UE 115 as described herein. The process flow 500 may also include a base station 105-c which may be an example of the base station 105 as described herein. In the following description of the process flow 500, the operations between the base station 105-c and the UE 115-e may be transmitted in a different order than the example order shown, or the operations performed by between the base station 105-c and the UE 115-e may be performed in different orders or at different times. Some operations may also be omitted from the process flow 500, and other operations may be added to the process flow 500.

At 505, the base station 105-c may communicate with the UE 115-e. At 510, the base station 105-c may identify that the base station 105-c is transitioning to a communication state associated with a capability limitation of the base station 105-c in which the base station 105-c does not support at least one communications application while operating in the communication state.

At 515, the base station 105-c may determine that the base station has scheduled communications with the UE 115-e in accordance with an SPS configuration or a configured grant.

At 520, the base station 105-c may transmit an update message indicating an update for the SPS configuration or the configured grant based on the capability limitation of the base station 105-c. In some examples, the base station 105-c may transmit the update message via layer 1 or layer 2 signaling such as via a MAC-CE message or a DCI message. In some examples, the SPS configuration may include a set of scheduled uplink transmissions or a set of scheduled downlink transmissions, and the base station 105-c may transmit with the update message an indication to cancel at least one of the set of scheduled uplink transmissions or at least one of the set of scheduled downlink transmissions.

In some examples, the communication state is one of a set of operating modes, and each operating mode of the set of operating modes is associated with a respective time domain resource allocation. The base station 105-c may transmit, with the update message, an indication of the respective time domain resource allocation associated with the communication state.

In some examples, the communication state is one of a set of operating modes, and each operating mode of the set of operating modes is associated with a respective operating bandwidth or a respective resource block allocation. The base station 105-c may transmit, with the update message, an indication of the respective operating bandwidth or the respective resource block allocation associated with the communication state.

In some examples, the communication state is one of a set of operating modes, and each operating mode of the set of operating modes is associated with a respective set of beams, a respective MCS, a respective rank, or a combination thereof. The base station 105-c may transmit, with the update message, an indication of the respective set of beams, the respective MCS, the respective rank, or combination thereof, associated with the communication state.

In some examples, the SPS configuration or the configured grant is associated with a first periodicity, and the base station 105-c may transmit, with the update message, an indication of a second periodicity that is longer than the first periodicity. In some examples, the SPS configuration includes a set of SPS indices associated with a set of communications applications including the at least one communications application, and the base station 105-c transmits, with the update message, an indication to deactivate an SPS index of the set of SPS indices associated with the at least one communications application.

At 525, the base station 105-c may communicate with the UE 115-e in accordance with the update for the SPS configuration or the configured grant.

Figure 6:
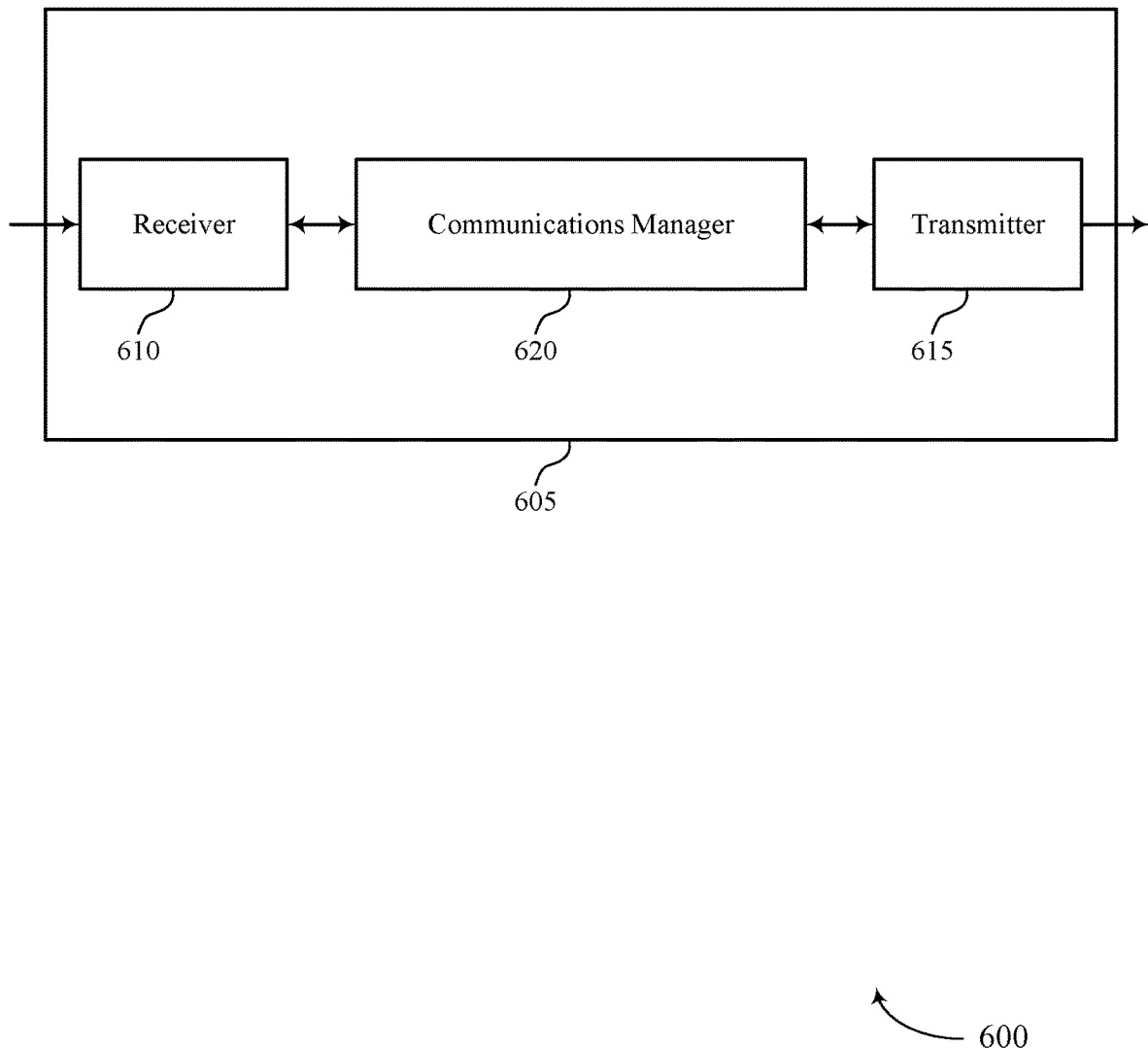
FIGS. 6 and 7 show block diagrams of devices that support communications state switching of a base station in accordance with aspects of the present disclosure.

FIG. 6 shows a block diagram 600 of a device 605 that supports communications state switching of a base station in accordance with aspects of the present disclosure. The device 605 may be an example of aspects of a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to communications state switching of a base station). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to communications state switching of a base station). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of communications state switching of a base station as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a base station in accordance with examples as disclosed herein. For example, the communications manager 620 may be configured as or otherwise support a means for identifying that the base station is transitioning to a communication state associated with a capability limitation in which the base station does not support at least one communications application while operating in the communication state. The communications manager 620 may be configured as or otherwise support a means for transmitting, to a UE, a message indicating the capability limitation. The communications manager 620 may be configured as or otherwise support a means for communicating with the UE in the communication state based on the capability limitation.

Additionally or alternatively, the communications manager 620 may support wireless communications at a base station in accordance with examples as disclosed herein. For example, the communications manager 620 may be configured as or otherwise support a means for identifying that the base station is transitioning to a communication state associated with a capability limitation in which the base station does not support at least one communications application while operating in the communication state. The communications manager 620 may be configured as or otherwise support a means for determining that the base station has scheduled communications with a UE in accordance with an SPS configuration or a configured grant. The communications manager 620 may be configured as or otherwise support a means for transmitting, to the UE, a message indicating an update for the SPS configuration or the configured grant based on the capability limitation for communicating with the UE in accordance with the update for the SPS configuration or the configured grant.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced power consumption at a base station by facilitating operating in energy saving modes at the base station.

Figure 7:
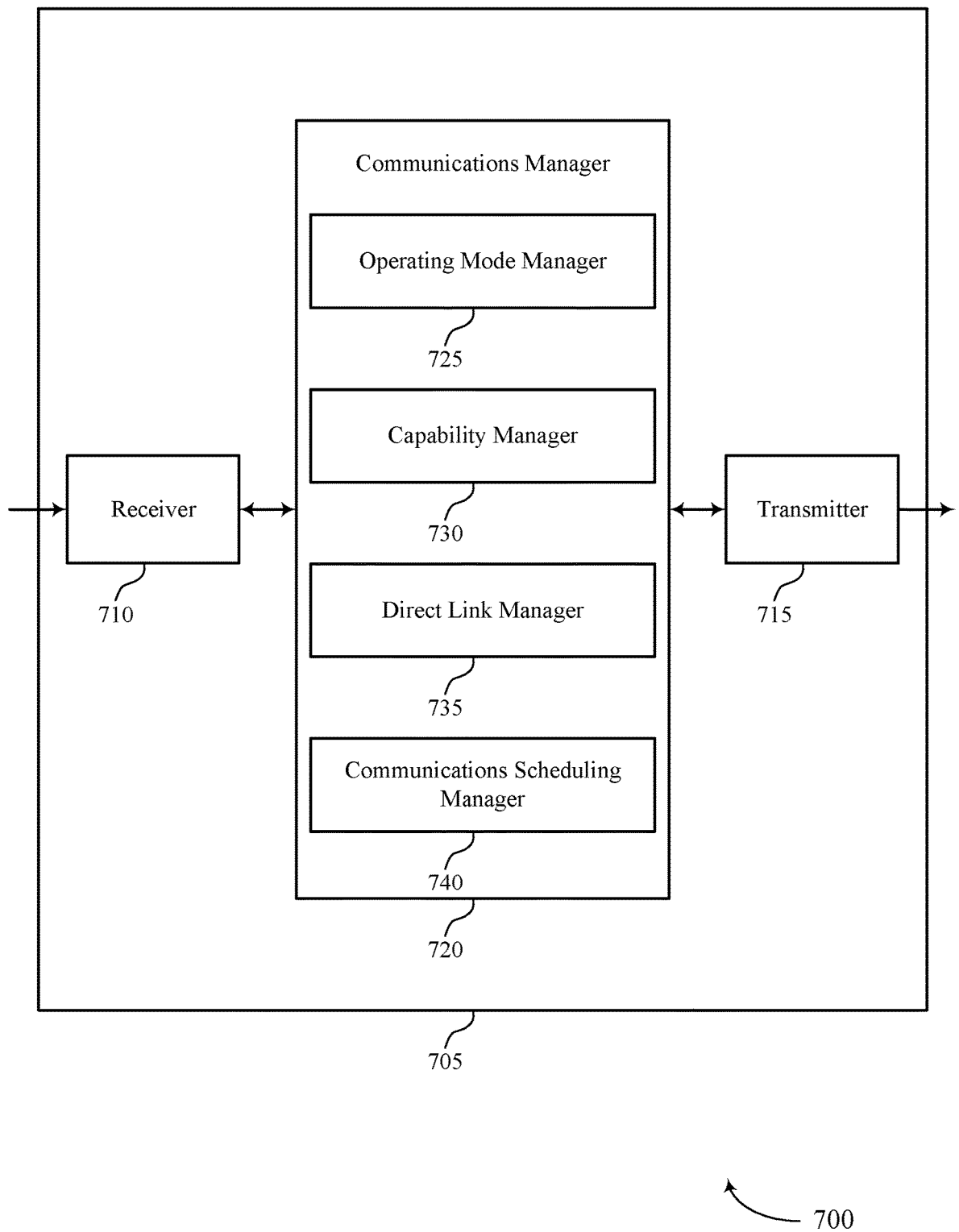

FIG. 7 shows a block diagram 700 of a device 705 that supports communications state switching of a base station in accordance with aspects of the present disclosure. The device 705 may be an example of aspects of a device 605 or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to communications state switching of a base station). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to communications state switching of a base station). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of communications state switching of a base station as described herein. For example, the communications manager 720 may include an operating mode manager 725, a capability manager 730, a direct link manager 735, a communications scheduling manager 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a base station in accordance with examples as disclosed herein. The operating mode manager 725 may be configured as or otherwise support a means for identifying that the base station is transitioning to a communication state associated with a capability limitation in which the base station does not support at least one communications application while operating in the communication state. The capability manager 730 may be configured as or otherwise support a means for transmitting, to a UE, a message indicating the capability limitation. The direct link manager 735 may be configured as or otherwise support a means for communicating with the UE in the communication state based on the capability limitation.

Additionally or alternatively, the communications manager 720 may support wireless communications at a base station in accordance with examples as disclosed herein. The operating mode manager 725 may be configured as or otherwise support a means for identifying that the base station is transitioning to a communication state associated with a capability limitation in which the base station does not support at least one communications application while operating in the communication state. The communications scheduling manager 740 may be configured as or otherwise support a means for determining that the base station has scheduled communications with a UE in accordance with an SPS configuration or a configured grant. The communications scheduling manager 740 may be configured as or otherwise support a means for transmitting, to the UE, a message indicating an update for the SPS configuration or the configured grant based on the capability limitation. The direct link manager 735 may be configured as or otherwise support a means for communicating with the UE in accordance with the update for the SPS configuration or the configured grant.

Figure 8:
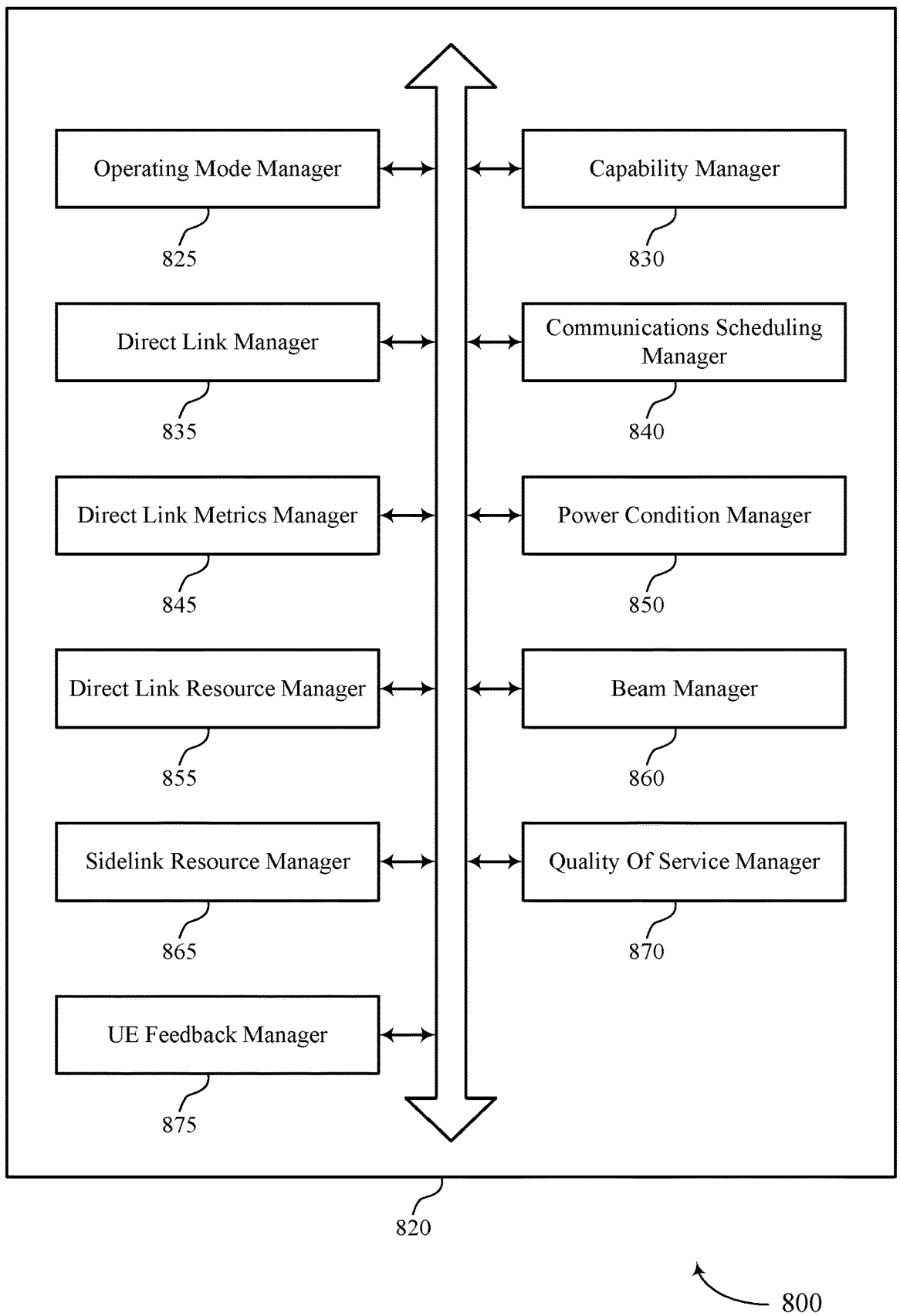
FIG. 8 shows a block diagram of a communications manager that supports communications state switching of a base station in accordance with aspects of the present disclosure.

FIG. 8 shows a block diagram 800 of a communications manager 820 that supports communications state switching of a base station in accordance with aspects of the present disclosure. The communications manager 820 may be an example of aspects of a communications manager 620, a communications manager 720, or both, as described herein. The communications manager 820, or various components thereof, may be an example of means for performing various aspects of communications state switching of a base station as described herein. For example, the communications manager 820 may include an operating mode manager 825, a capability manager 830, a direct link manager 835, a communications scheduling manager 840, a direct link metrics manager 845, a power condition manager 850, a direct link resource manager 855, a beam manager 860, a sidelink resource manager 865, a quality of service manager 870, a UE feedback manager 875, or any combination thereof. Each of these components may communicate, directly or indirectly, with one another (e.g., via one or more buses).

The communications manager 820 may support wireless communications at a base station in accordance with examples as disclosed herein. The operating mode manager 825 may be configured as or otherwise support a means for identifying that the base station is transitioning to a communication state associated with a capability limitation in which the base station does not support at least one communications application while operating in the communication state. The capability manager 830 may be configured as or otherwise support a means for transmitting, to a UE, a message indicating the capability limitation. In some examples, to support transmitting the message indicating the capability limitation, the capability manager 830 may be configured as or otherwise support a means for transmitting the message via layer 1 or layer 2 signaling such as via a DCI signal or via a MAC-CE signal. The direct link manager 835 may be configured as or otherwise support a means for communicating with the UE in the communication state based on the capability limitation.

In some examples, the operating mode manager 825 may be configured as or otherwise support a means for transmitting, to the UE, an indication of a set of multiple operating modes associated with a respective set of multiple capability limitations, where the communication state is one of the set of multiple operating modes.

In some examples, to support transmitting the message indicating the capability limitation, the operating mode manager 825 may be configured as or otherwise support a means for transmitting, with the message, an indication of the communication state, which is a selected mode of the set of multiple operating modes.

In some examples, the set of multiple operating modes are associated with an ability to support URLLC with a first delay requirement, URLLC with a second delay requirement, URLLC with a first block error ratio, URLLC with a second block error ratio, enhanced mobile broadband, or a combination thereof.

In some examples, the sidelink resource manager 865 may be configured as or otherwise support a means for transmitting, to the UE, an indication of a respective resource allocation for the UE for communications in a sidelink mode for each of the set of multiple operating modes.

In some examples, each of the set of multiple operating modes is associated with a respective QoS target of a set of multiple QoS targets, and to support identifying that the base station is transitioning to the communication state, the quality of service manager 870 may be configured as or otherwise support a means for identifying a QoS target associated with the communication state from the set of multiple QoS targets.

In some examples, the direct link manager 835 may be configured as or otherwise support a means for communicating with a set of multiple UEs, where the set of multiple UEs includes the UE. In some examples, the UE feedback manager 875 may be configured as or otherwise support a means for receiving, from each UE of the set of multiple UEs, communications metric feedback information, where each operating mode of the set of multiple operating modes is associated with one of a set of multiple thresholds associated with a communications metric.

In some examples, a first mode of the set of multiple operating modes corresponds to an acknowledgement and negative acknowledgement mode, a second mode of the set of multiple operating modes corresponds to an acknowledgement only mode, a third mode of the set of multiple operating modes corresponds to a negative acknowledgement only mode, and a fourth mode of the set of multiple operating modes corresponds to a non-feedback mode.

In some examples, the direct link manager 835 may be configured as or otherwise support a means for communicating with a set of multiple UEs, where the set of multiple UEs includes the UE, and the direct link metrics manager 845 may be configured as or otherwise support a means for identifying that the base station is transitioning to the communication state by identifying that a threshold number of UEs of the set of multiple UEs are associated with one or more communications metrics satisfying one or more thresholds.

In some examples, the one or more communications metrics include an estimated pathloss, a signal to interference and noise ratio, a reference signal received power, or a combination thereof.

In some examples, the direct link manager 835 may be configured as or otherwise support a means for communicating with a set of multiple UEs, where the set of multiple UEs includes the UE. In some examples, the power condition manager 850 may be configured as or otherwise support a means for determining a power condition to maintain a QoS target with the set of multiple UEs, and where identifying that the base station is transitioning to the communication state is based on the determined power condition.

In some examples, the communication state is associated with an energy saving mode.

In some examples, the communications scheduling manager 840 may be configured as or otherwise support a means for: determining that the base station has scheduled communications with the UE in accordance with a semi-persistent scheduling configuration or a configured grant; and transmitting, with the message, an indication of an update for the semi-persistent scheduling configuration or the configured grant based at least in part on the capability limitation. The direct link manager 835 may be configured as or otherwise support a means for communicating with the UE in accordance with the update for the semi-persistent scheduling configuration or the configured grant. In some examples, where the SPS configuration includes a set of multiple scheduled uplink transmissions or the configured grant includes a set of multiple scheduled downlink transmissions, the communications scheduling manager 840 may be configured as or otherwise support a means for transmitting, with the message, an indication to cancel at least one of the set of multiple scheduled uplink transmissions or at least one of the set of multiple scheduled downlink transmissions. In some examples, where the communication state is one of a set of multiple operating modes, and where each operating mode of the set of multiple operating modes is associated with a respective time domain resource allocation, a respective operating bandwidth, or a respective resource block allocation, the direct link resource manager 835 may be configured as or otherwise support a means for transmitting, with the message, an indication of the respective time domain resource allocation, the respective operating bandwidth, or the respective resource block allocation associated with the communication state.

Additionally or alternatively, the communications manager 820 may support wireless communications at a base station in accordance with examples as disclosed herein. In some examples, the operating mode manager 825 may be configured as or otherwise support a means for identifying that the base station is transitioning to a communication state associated with a capability limitation in which the base station does not support at least one communications application while operating in the communication state. The communications scheduling manager 840 may be configured as or otherwise support a means for determining that the base station has scheduled communications with a UE in accordance with an SPS configuration or a configured grant. In some examples, the communications scheduling manager 840 may be configured as or otherwise support a means for transmitting, to the UE, a message indicating an update for the SPS configuration or the configured grant based on the capability limitation. In some examples, the direct link manager 835 may be configured as or otherwise support a means for communicating with the UE in accordance with the update for the SPS configuration or the configured grant.

In some examples, the SPS configuration includes a set of multiple scheduled uplink transmissions or the configured grant includes a set of multiple scheduled downlink transmissions, and to support transmitting the message, the communications scheduling manager 840 may be configured as or otherwise support a means for transmitting an indication to cancel at least one of the set of multiple scheduled uplink transmissions or at least one of the set of multiple scheduled downlink transmissions.

In some examples, the communication state is one of a set of multiple operating modes and each operating mode of the set of multiple operating modes is associated with a respective time domain resource allocation, and the direct link resource manager 855 may be configured as or otherwise support a means for transmitting, with the message, an indication of the respective time domain resource allocation associated with the communication state.

In some examples, the communication state is one of a set of multiple operating modes and each operating mode of the set of multiple operating modes is associated with a respective operating bandwidth or a respective resource block allocation, and the direct link resource manager 855 may be configured as or otherwise support a means for transmitting, with the message, an indication of the respective operating bandwidth or the respective resource block allocation associated with the communication state.

In some examples, the communication state is one of a set of multiple operating modes and each operating mode of the set of multiple operating modes is associated with a respective set of beams, a respective modulation and coding scheme, a respective rank, or a combination thereof, and the beam manager 860 may be configured as or otherwise support a means for transmitting, with the message, an indication of the respective set of beams, the respective modulation and coding scheme, the respective rank, or combination thereof associated with the communication state.

In some examples, to support transmitting the message, the communications scheduling manager 840 may be configured as or otherwise support a means for transmitting the message via a radio resource control signal or via a MAC-CE signal.

In some examples, the SPS configuration or the configured grant is associated with a first periodicity, and to support transmitting the message, the communications scheduling manager 840 may be configured as or otherwise support a means for transmitting with the message an indication of a second periodicity that is longer than the first periodicity, and where to support communicating with the UE in accordance with the update, the direct link manager 835 may be configured as or otherwise support a means for communicating with the UE in accordance with the second periodicity.

In some examples, the SPS configuration may include a set of multiple SPS scheduling indices associated with a set of multiple communications applications, where the set of multiple communications applications includes the at least one communications application, and to support wireless communications, the communications scheduling manager 840 may be configured as or otherwise support a means for transmitting, with the message, an indication to deactivate an SPS index of the set of multiple SPS indices associated with the at least one communications application.

In some examples, the communication state is associated with an energy saving mode.

Figure 9:
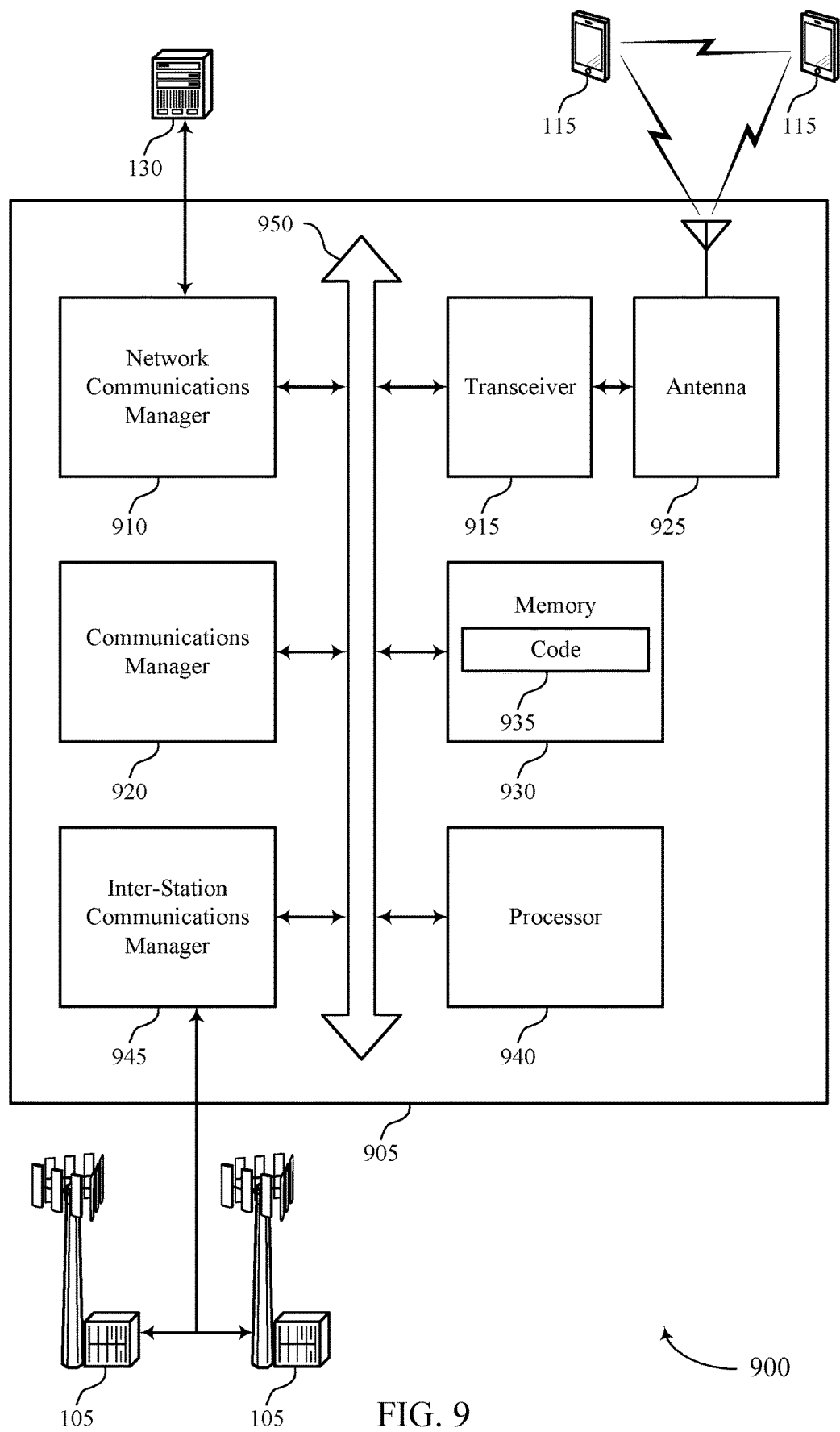
FIG. 9 shows a diagram of a system including a device that supports communications state switching of a base station in accordance with aspects of the present disclosure.

FIG. 9 shows a diagram of a system 900 including a device 905 that supports communications state switching of a base station in accordance with aspects of the present disclosure. The device 905 may be an example of or include the components of a device 605, a device 705, or a base station 105 as described herein. The device 905 may communicate wirelessly with one or more base stations 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (e.g., operatively, communicatively, functionally, electronically, electrically) via one or more buses (e.g., a bus 950).

The network communications manager 910 may manage communications with a core network 130 (e.g., via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting communications state switching of a base station). For example, the device 905 or a component of the device 905 may include a processor 940 and memory 930 coupled to the processor 940, the processor 940 and memory 930 configured to perform various functions described herein.

The inter-station communications manager 945 may manage communications with other base stations 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between base stations 105.

The communications manager 920 may support wireless communications at a base station in accordance with examples as disclosed herein. For example, the communications manager 920 may be configured as or otherwise support a means for identifying that the base station is transitioning to a communication state associated with a capability limitation in which the base station does not support at least one communications application while operating in the communication state. The communications manager 920 may be configured as or otherwise support a means for transmitting, to a UE, a message indicating the capability limitation. The communications manager 920 may be configured as or otherwise support a means for communicating with the UE in the communication state based on the capability limitation.

Additionally or alternatively, the communications manager 920 may support wireless communications at a base station in accordance with examples as disclosed herein. For example, the communications manager 920 may be configured as or otherwise support a means for identifying that the base station is transitioning to a communication state associated with a capability limitation in which the base station does not support at least one communications application while operating in the communication state. The communications manager 920 may be configured as or otherwise support a means for determining that the base station has scheduled communications with a UE in accordance with an SPS configuration or a configured grant. The communications manager 920 may be configured as or otherwise support a means for transmitting, to the UE, a message indicating an update for the SPS configuration or the configured grant based on the capability limitation. The communications manager 920 may be configured as or otherwise support a means for communicating with the UE in accordance with the update for the SPS configuration or the configured grant.

By including or configuring the communications manager 920 in accordance with examples as described herein, the device 905 may support techniques for reduced power consumption and improved coordination between devices by facilitating operating in energy saving modes at the base station and signaling to UEs being served by the base station that the base station may be unable to support one or more communications applications.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of communications state switching of a base station as described herein, or the processor 940 and the memory 930 may be otherwise configured to perform or support such operations.

Figure 10:
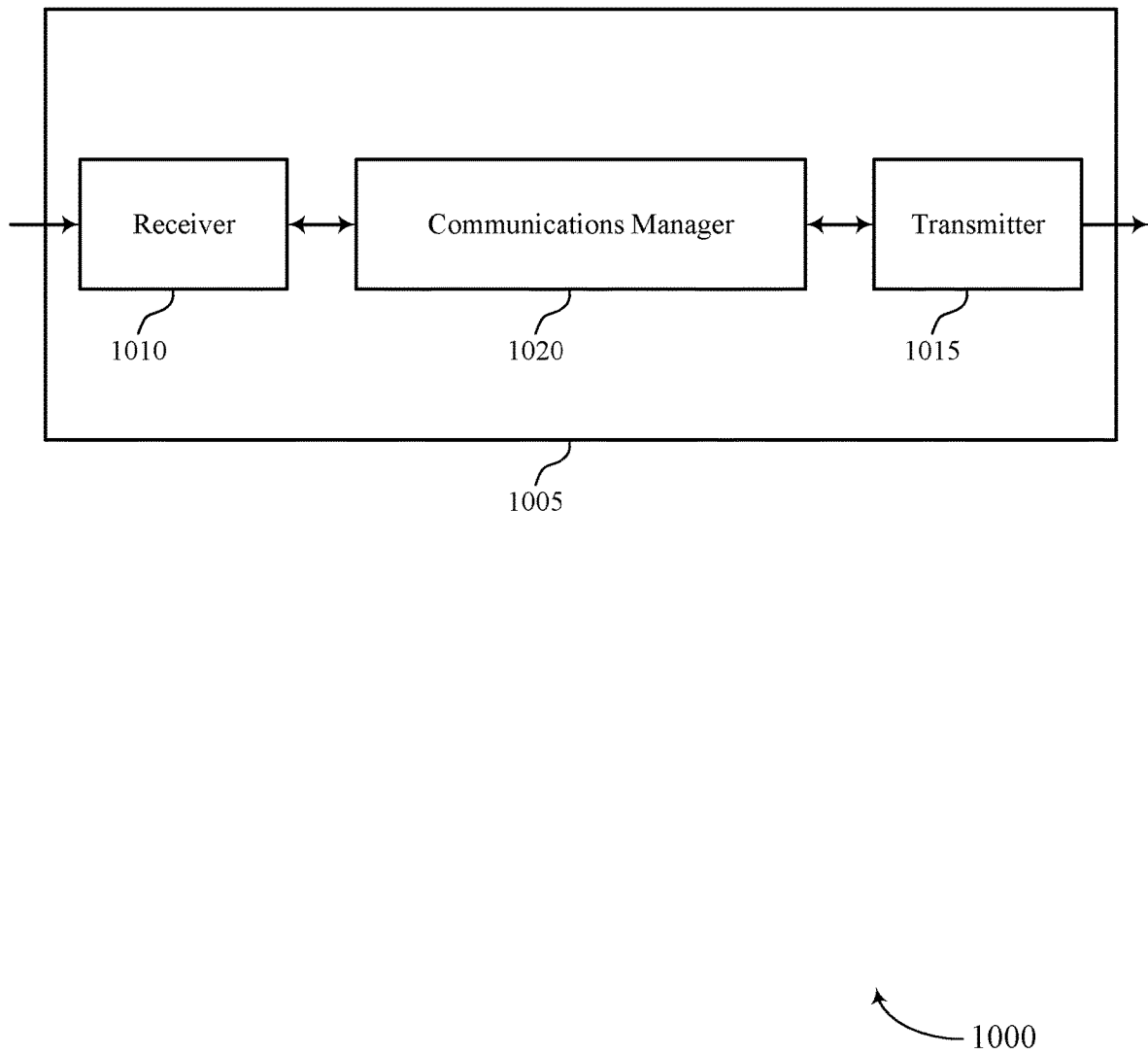
FIGS. 10 and 11 show block diagrams of devices that support communications state switching of a base station in accordance with aspects of the present disclosure.

FIG. 10 shows a block diagram 1000 of a device 1005 that supports communications state switching of a base station in accordance with aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to communications state switching of a base station). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to communications state switching of a base station). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of communications state switching of a base station as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. For example, the communications manager 1020 may be configured as or otherwise support a means for receiving, from a base station, a message indicating a capability limitation in which the base station does not support at least one communications application while operating in a communication state. The communications manager 1020 may be configured as or otherwise support a means for communicating with the base station based on the capability limitation.

Additionally or alternatively, the communications manager 1020 may support wireless communications at a UE in accordance with examples as disclosed herein. For example, the communications manager 1020 may be configured as or otherwise support a means for receiving, from a base station, an SPS configuration or a configured grant. The communications manager 1020 may be configured as or otherwise support a means for receiving, from the base station, a message indicating an update for the SPS configuration or the configured grant based on a capability limitation in which the base station does not support at least one communications application while operating in a communication state. The communications manager 1020 may be configured as or otherwise support a means for communicating with the base station in accordance with the update for the SPS configuration or the configured grant.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources by receiving signaling indicating that the base station may be unable to support one or more communications applications and operating accordingly.

Figure 11:
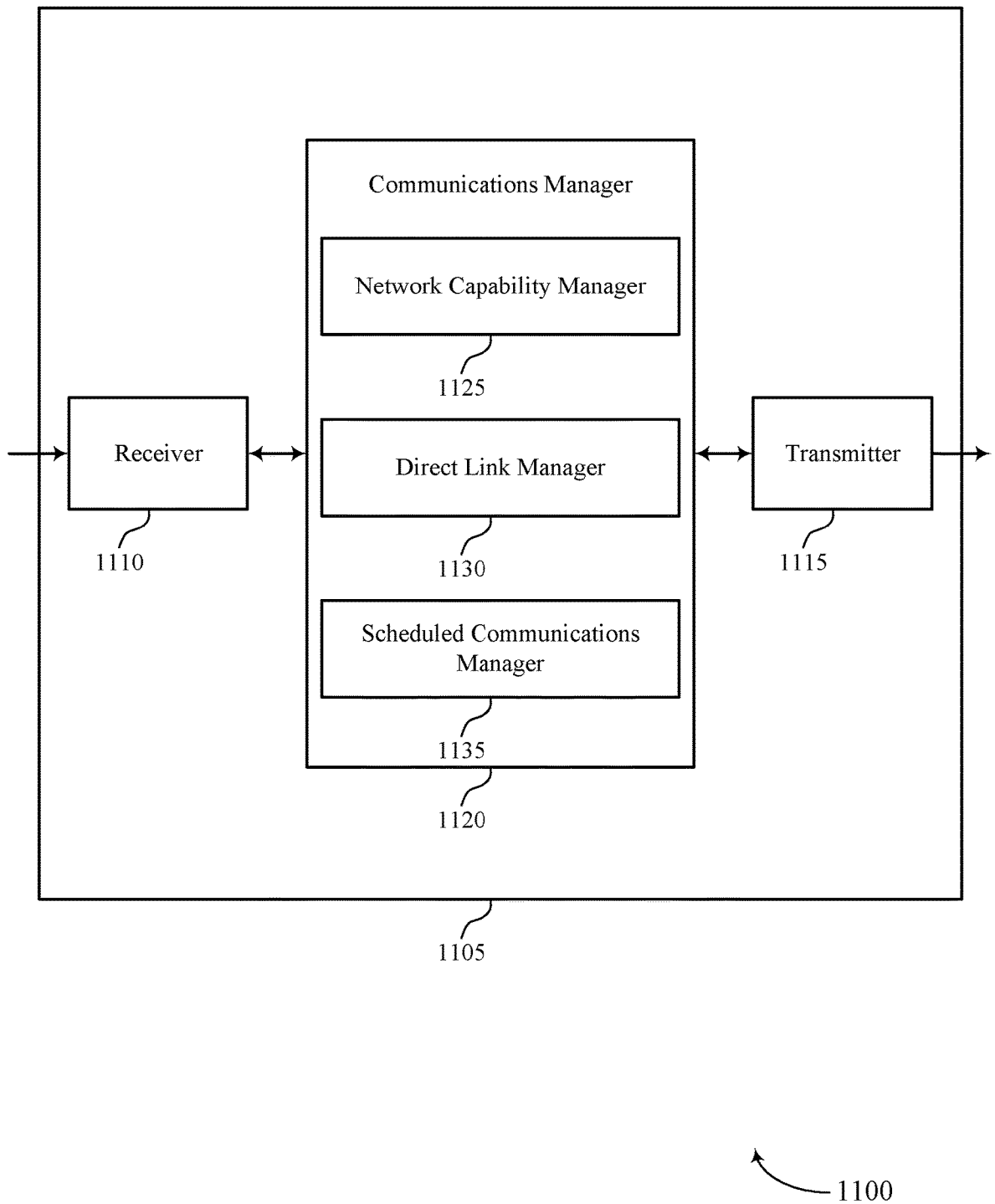

FIG. 11 shows a block diagram 1100 of a device 1105 that supports communications state switching of a base station in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to communications state switching of a base station). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to communications state switching of a base station). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of communications state switching of a base station as described herein. For example, the communications manager 1120 may include a network capability manager 1125, a direct link manager 1130, a scheduled communications manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a UE in accordance with examples as disclosed herein. The network capability manager 1125 may be configured as or otherwise support a means for receiving, from a base station, a message indicating a capability limitation in which the base station does not support at least one communications application while operating in a communication state. In some examples, to support receiving the message indicating the capability limitation, the network capability manager 1125 may be configured as or otherwise support a means for receiving the message via layer 1 or layer 2 signaling such as via a DCI signal or via a MAC-CE signal. The direct link manager 1130 may be configured as or otherwise support a means for communicating with the base station based on the capability limitation.

Additionally or alternatively, the communications manager 1120 may support wireless communications at a UE in accordance with examples as disclosed herein. The scheduled communications manager 1135 may be configured as or otherwise support a means for receiving, from a base station, an SPS configuration or a configured grant. The scheduled communications manager 1135 may be configured as or otherwise support a means for receiving, from the base station, a message indicating an update for the SPS configuration or the configured grant based on a capability limitation in which the base station does not support at least one communications application while operating in a communication state. In some examples, to support receiving the message indicating an update for the SPS configuration or the configured grant, the scheduled communications manager 1135 may be configured as or otherwise support a means for receiving the message via layer 1 or layer 2 signaling such as via a DCI signal or via a MAC-CE signal. The direct link manager 1130 may be configured as or otherwise support a means for communicating with the base station in accordance with the update for the SPS configuration or the configured grant.

Figure 12:
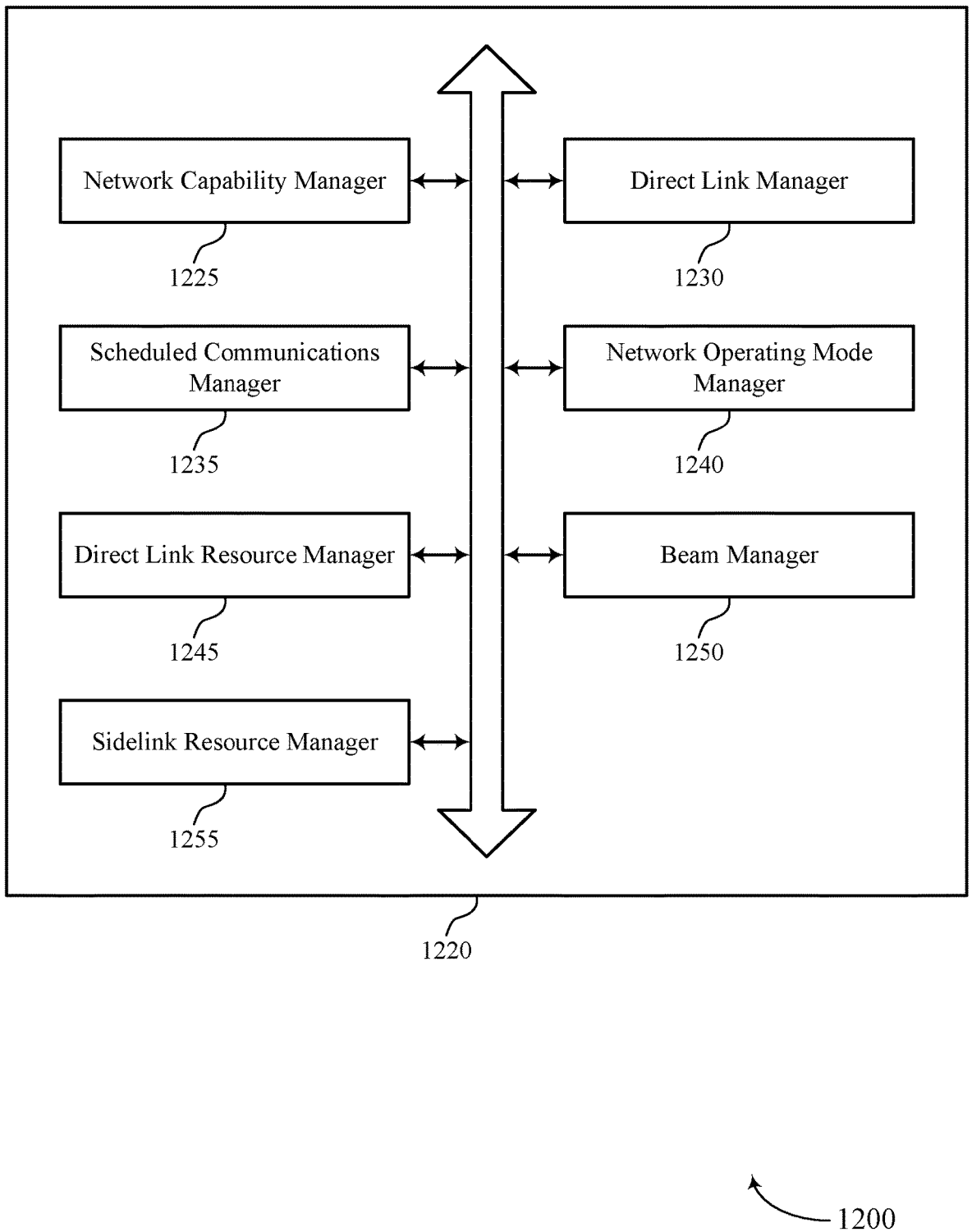
FIG. 12 shows a block diagram of a communications manager that supports communications state switching of a base station in accordance with aspects of the present disclosure.

FIG. 12 shows a block diagram 1200 of a communications manager 1220 that supports communications state switching of a base station in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of communications state switching of a base station as described herein. For example, the communications manager 1220 may include a network capability manager 1225, a direct link manager 1230, a scheduled communications manager 1235, a network operating mode manager 1240, a direct link resource manager 1245, a beam manager 1250, a sidelink resource manager 1255, or any combination thereof. Each of these components may communicate, directly or indirectly, with one another (e.g., via one or more buses).

The communications manager 1220 may support wireless communications at a UE in accordance with examples as disclosed herein. The network capability manager 1225 may be configured as or otherwise support a means for receiving, from a base station, a message indicating a capability limitation in which the base station does not support at least one communications application while operating in a communication state. The direct link manager 1230 may be configured as or otherwise support a means for communicating with the base station based on the capability limitation.

In some examples, the network operating mode manager 1240 may be configured as or otherwise support a means for receiving, from the base station, an indication of a set of multiple operating modes associated with a respective set of multiple capability limitations, where the communication state is one of the set of multiple operating modes.

In some examples, to support receiving the message indicating the capability limitation, the network operating mode manager 1240 may be configured as or otherwise support a means for receiving, with the message, an indication of the communication state, which is a selected mode of the set of multiple operating modes.

In some examples, the set of multiple operating modes are associated with an ability to support URLLC with a first delay requirement, URLLC with a second delay requirement, URLLC with a first block error ratio, URLLC with a second block error ratio, enhanced mobile broadband, or a combination thereof.

In some examples, the sidelink resource manager 1255 may be configured as or otherwise support a means for receiving, from the base station, an indication of a respective resource allocation for the UE for communications in a sidelink mode for each of the set of multiple operating modes.

In some examples, a first mode of the set of multiple operating modes corresponds to an acknowledgement and negative acknowledgement mode, a second mode of the set of multiple operating modes corresponds to an acknowledgement only mode, a third mode of the set of multiple operating modes corresponds to a negative acknowledgement only mode, and a fourth mode of the set of multiple operating modes corresponds to a non-feedback mode.

In some examples, the communication state is associated with an energy saving mode.

In some examples, the scheduled communications manager 1235 may be configured as or otherwise support a means for: receiving, from the base station, an SPS configuration or a configured grant; and receiving, with the message, an update for the SPS configuration or the configured grant based on the capability limitation. The direct link manager 1230 may be configured as or otherwise support a means for communicating with the base station in accordance with the update for the SPS configuration or the configured grant. In some examples, where the SPS configuration includes a set of multiple scheduled uplink transmissions or the configured grant includes a set of multiple downlink transmissions, the scheduled communications manager 1235 may be configured as or otherwise support a means for receiving an indication to cancel at least one of the set of multiple scheduled uplink transmissions or at least one of the set of multiple of scheduled downlink transmissions. In some examples, where the communication state is one of a set of multiple operating modes, and where each operating mode of the set of multiple operating modes is associated with a respective time domain resource allocation, a respective operating bandwidth, or a respective resource block allocation, the direct link resource manager 1245 may be configured as or otherwise support a means for receiving, with the message, an indication of the respective time domain resource allocation, the respective operating bandwidth, or the respective resource block allocation associated with the communication state.

Additionally or alternatively, the communications manager 1220 may support wireless communications at a UE in accordance with examples as disclosed herein. The scheduled communications manager 1235 may be configured as or otherwise support a means for receiving, from a base station, an SPS configuration or a configured grant. In some examples, the scheduled communications manager 1235 may be configured as or otherwise support a means for receiving, from the base station, a message indicating an update for the SPS configuration or the configured grant based on a capability limitation in which the base station does not support at least one communications application while operating in a communication state. In some examples, the direct link manager 1230 may be configured as or otherwise support a means for communicating with the base station in accordance with the update for the SPS configuration or the configured grant.

In some examples, the SPS configuration includes a set of multiple scheduled uplink transmissions or the configured grant includes a set of multiple scheduled downlink transmissions, and to support receiving the message, the scheduled communications manager 1235 may be configured as or otherwise support a means for receiving an indication to cancel at least one of the set of multiple scheduled uplink transmissions or at least one of the set of multiple scheduled downlink transmissions.

In some examples, the communication state is one of a set of multiple operating modes and each operating mode of the set of multiple operating modes is associated with a respective time domain resource allocation, and the direct link resource manager 1245 may be configured as or otherwise support a means for receiving, with the message, an indication of the respective time domain resource allocation associated with the communication state.

In some examples, the communication state is one of a set of multiple operating modes and each operating mode of the set of multiple operating modes is associated with a respective operating bandwidth, and the direct link resource manager 1245 may be configured as or otherwise support a means for receiving, with the message, an indication of the respective operating bandwidth or the respective resource block allocation associated with the communication state.

In some examples, the communication state is one of a set of multiple operating modes and each operating mode of the set of multiple operating modes is associated with a respective set of beams, a respective modulation and coding scheme, a respective rank, or a combination thereof, and the beam manager 1250 may be configured as or otherwise support a means for receiving, with the message, an indication of the respective set of beams, the respective modulation and coding scheme, the respective rank, or combination thereof associated with the communication state.

In some examples, the communication state is associated with an energy saving mode.

Figure 13:
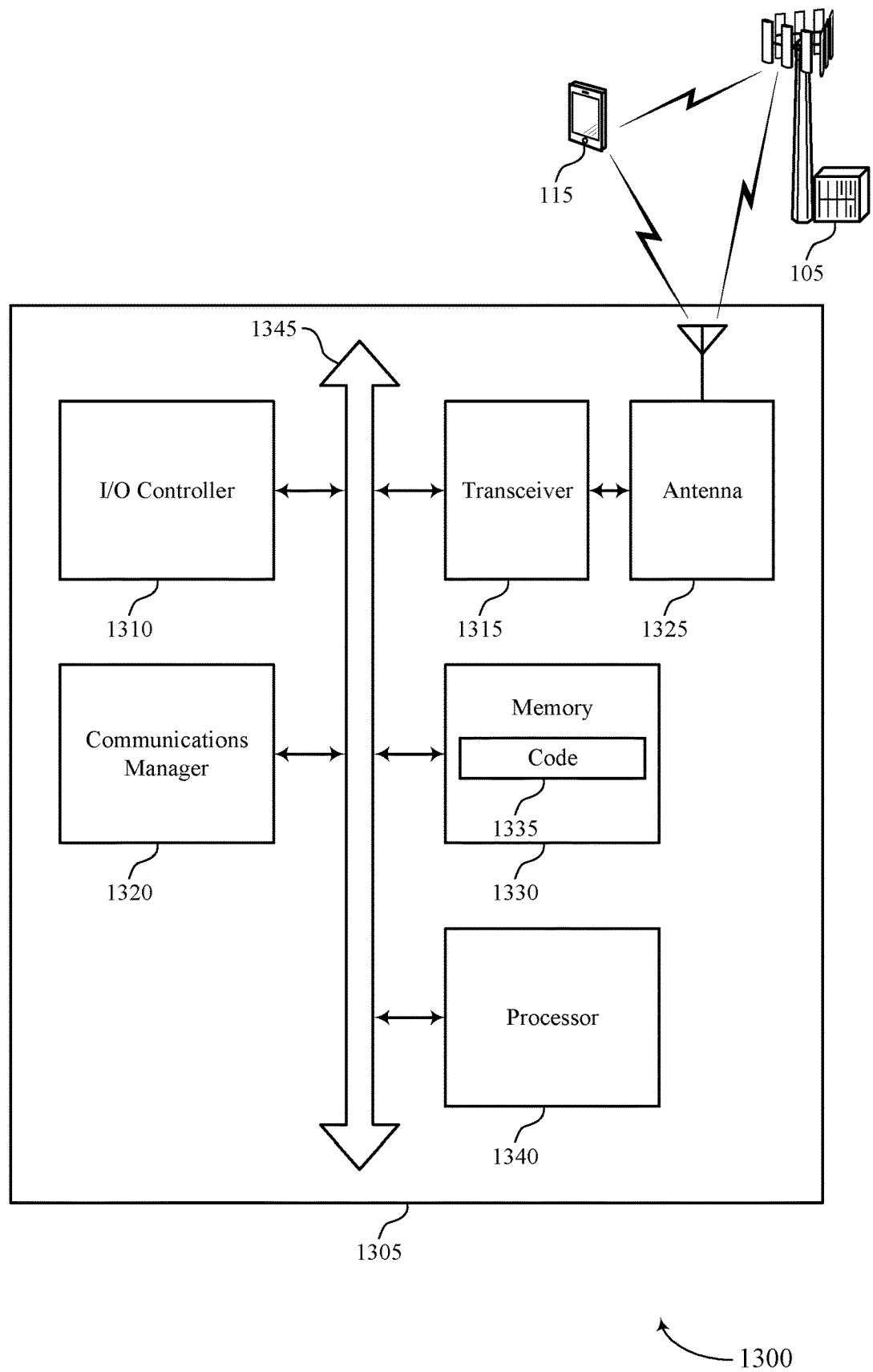
FIG. 13 shows a diagram of a system including a device that supports communications state switching of a base station in accordance with aspects of the present disclosure.

FIG. 13 shows a diagram of a system 1300 including a device 1305 that supports communications state switching of a base station in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting communications state switching of a base station). For example, the device 1305 or a component of the device 1305 may include a processor 1340 and memory 1330 coupled to the processor 1340, the processor 1340 and memory 1330 configured to perform various functions described herein.

The communications manager 1320 may support wireless communications at a UE in accordance with examples as disclosed herein. For example, the communications manager 1320 may be configured as or otherwise support a means for receiving, from a base station, a message indicating a capability limitation in which the base station does not support at least one communications application while operating in a communication state. The communications manager 1320 may be configured as or otherwise support a means for communicating with the base station based on the capability limitation.

Additionally or alternatively, the communications manager 1320 may support wireless communications at a UE in accordance with examples as disclosed herein. For example, the communications manager 1320 may be configured as or otherwise support a means for receiving, from a base station, an SPS configuration or a configured grant. The communications manager 1320 may be configured as or otherwise support a means for receiving, from the base station, a message indicating an update for the SPS configuration or the configured grant based on a capability limitation in which the base station does not support at least one communications application while operating in a communication state. The communications manager 1320 may be configured as or otherwise support a means for communicating with the base station in accordance with the update for the SPS configuration or the configured grant.

By including or configuring the communications manager 1320 in accordance with examples as described herein, the device 1305 may support techniques for more efficient utilization of communication resources and improved coordination between devices by receiving signaling indicating that the base station may be unable to support one or more communications applications and operating accordingly.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of communications state switching of a base station as described herein, or the processor 1340 and the memory 1330 may be otherwise configured to perform or support such operations.

Figure 14:
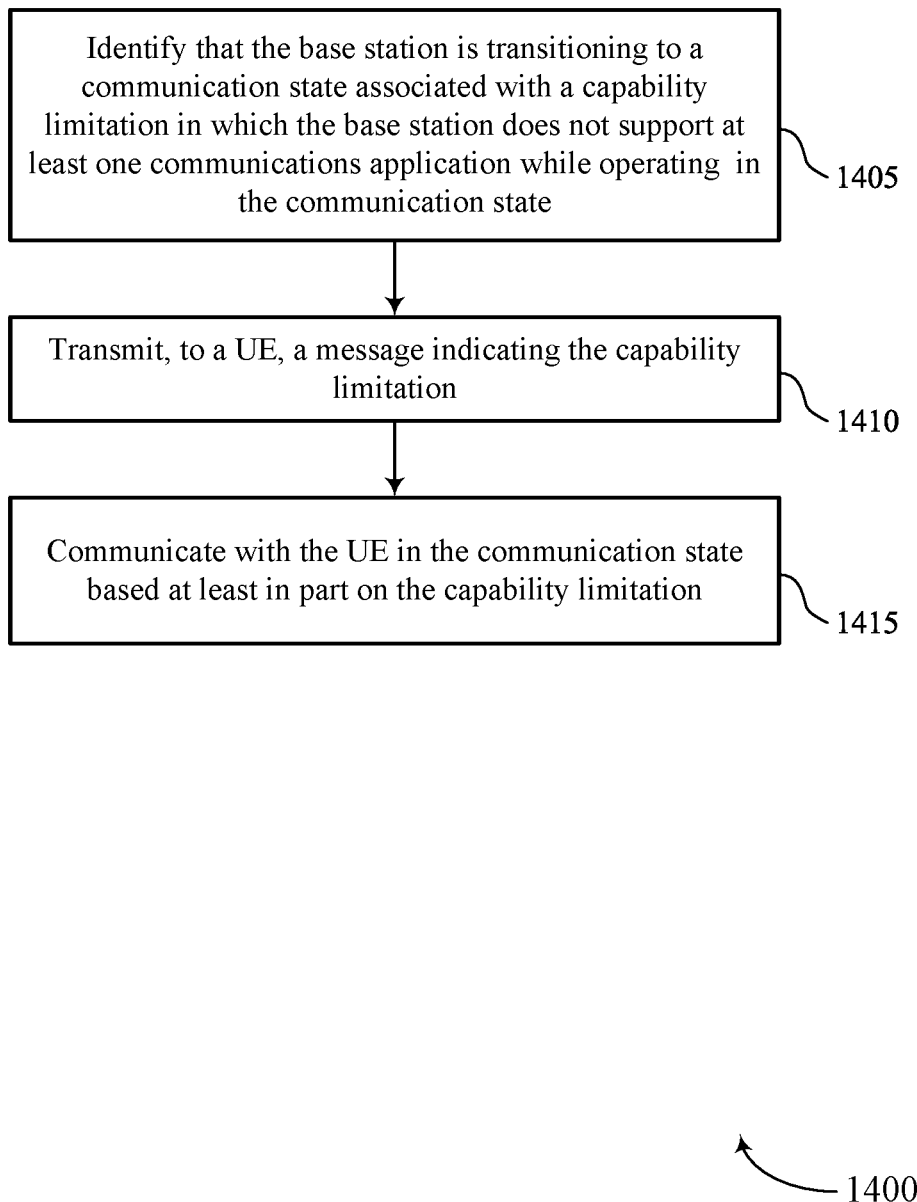
FIGS. 14 through 21 show flowcharts illustrating methods that support communications state switching of a base station in accordance with aspects of the present disclosure.

FIG. 14 shows a flowchart illustrating a method 1400 that supports communications state switching of a base station in accordance with aspects of the present disclosure. The operations of the method 1400 may be implemented by a base station or its components as described herein. For example, the operations of the method 1400 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1405, the method may include identifying that the base station is transitioning to a communication state associated with a capability limitation in which the base station does not support at least one communications application while operating in the communication state. The operations of 1405 may be performed in accordance with examples as disclosed herein. In some examples, aspects of the operations of 1405 may be performed by an operating mode manager 825 as described with reference to FIG. 8.

At 1410, the method may include transmitting, to a UE, a message indicating the capability limitation. The operations of 1410 may be performed in accordance with examples as disclosed herein. In some examples, aspects of the operations of 1410 may be performed by a capability manager 830 as described with reference to FIG. 8.

At 1415, the method may include communicating with the UE in the communication state based on the capability limitation. The operations of 1415 may be performed in accordance with examples as disclosed herein. In some examples, aspects of the operations of 1415 may be performed by a direct link manager 835 as described with reference to FIG. 8.

Figure 15:
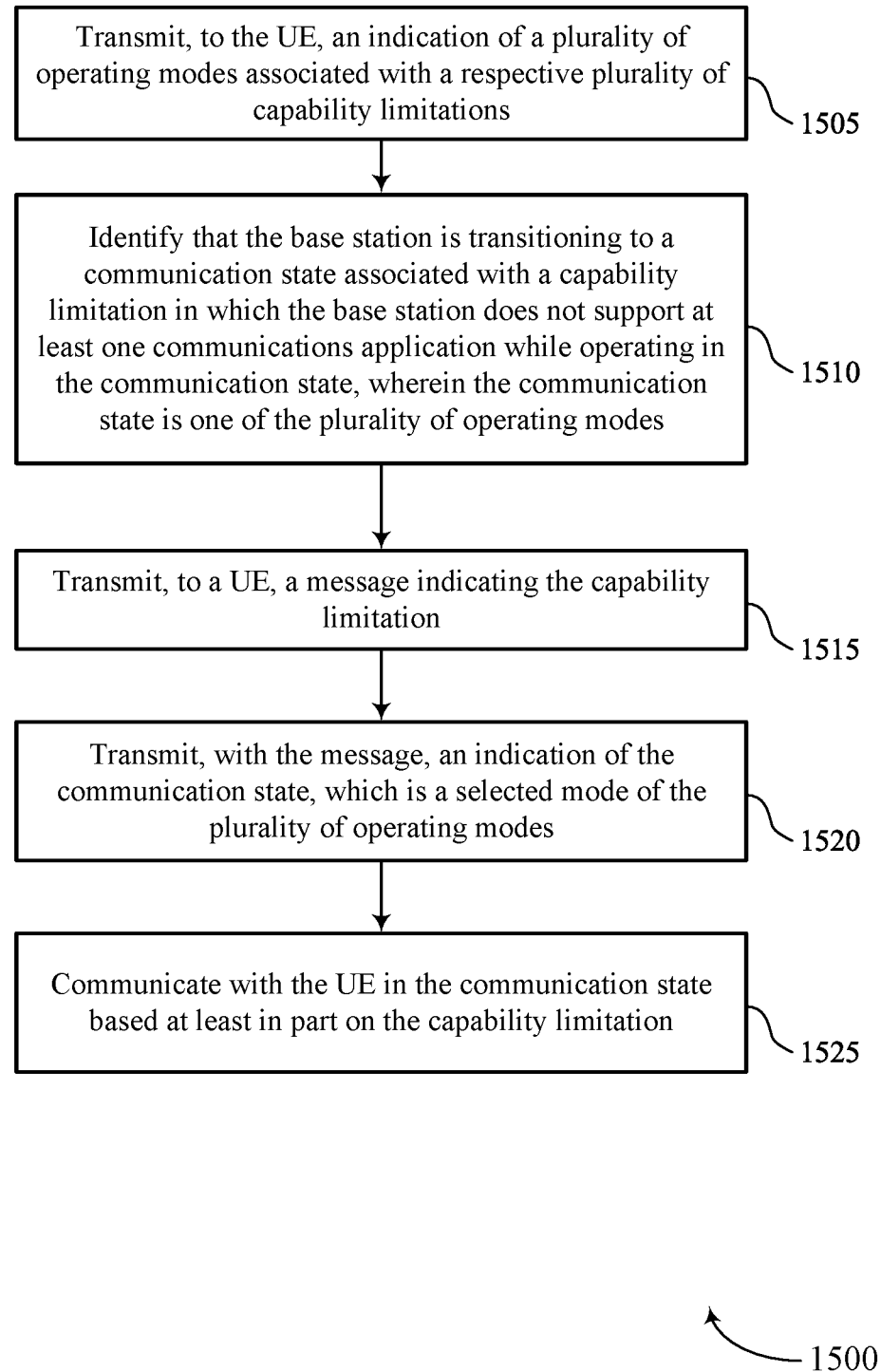

FIG. 15 shows a flowchart illustrating a method 1500 that supports communications state switching of a base station in accordance with aspects of the present disclosure. The operations of the method 1500 may be implemented by a base station or its components as described herein. For example, the operations of the method 1500 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1505, the method may include transmitting, to the UE, an indication of a set of multiple operating modes associated with a respective set of multiple capability limitations. The operations of 1505 may be performed in accordance with examples as disclosed herein. In some examples, aspects of the operations of 1505 may be performed by an operating mode manager 825 as described with reference to FIG. 8.

At 1510, the method may include identifying that the base station is transitioning to a communication state associated with a capability limitation in which the base station does not support at least one communications application while operating in the communication state, where the communication state is one of the set of multiple operating modes. The operations of 1510 may be performed in accordance with examples as disclosed herein. In some examples, aspects of the operations of 1510 may be performed by an operating mode manager 825 as described with reference to FIG. 8.

At 1515, the method may include transmitting, to a UE, a message indicating the capability limitation. The operations of 1515 may be performed in accordance with examples as disclosed herein. In some examples, aspects of the operations of 1515 may be performed by a capability manager 830 as described with reference to FIG. 8.

At 1520, the method may include transmitting, with the message, an indication of the communication state, which is a selected mode of the set of multiple operating modes. The operations of 1520 may be performed in accordance with examples as disclosed herein. In some examples, aspects of the operations of 1520 may be performed by an operating mode manager 825 as described with reference to FIG. 8.

At 1525, the method may include communicating with the UE in the communication state based on the capability limitation. The operations of 1525 may be performed in accordance with examples as disclosed herein. In some examples, aspects of the operations of 1525 may be performed by a direct link manager 835 as described with reference to FIG. 8.

Figure 16:
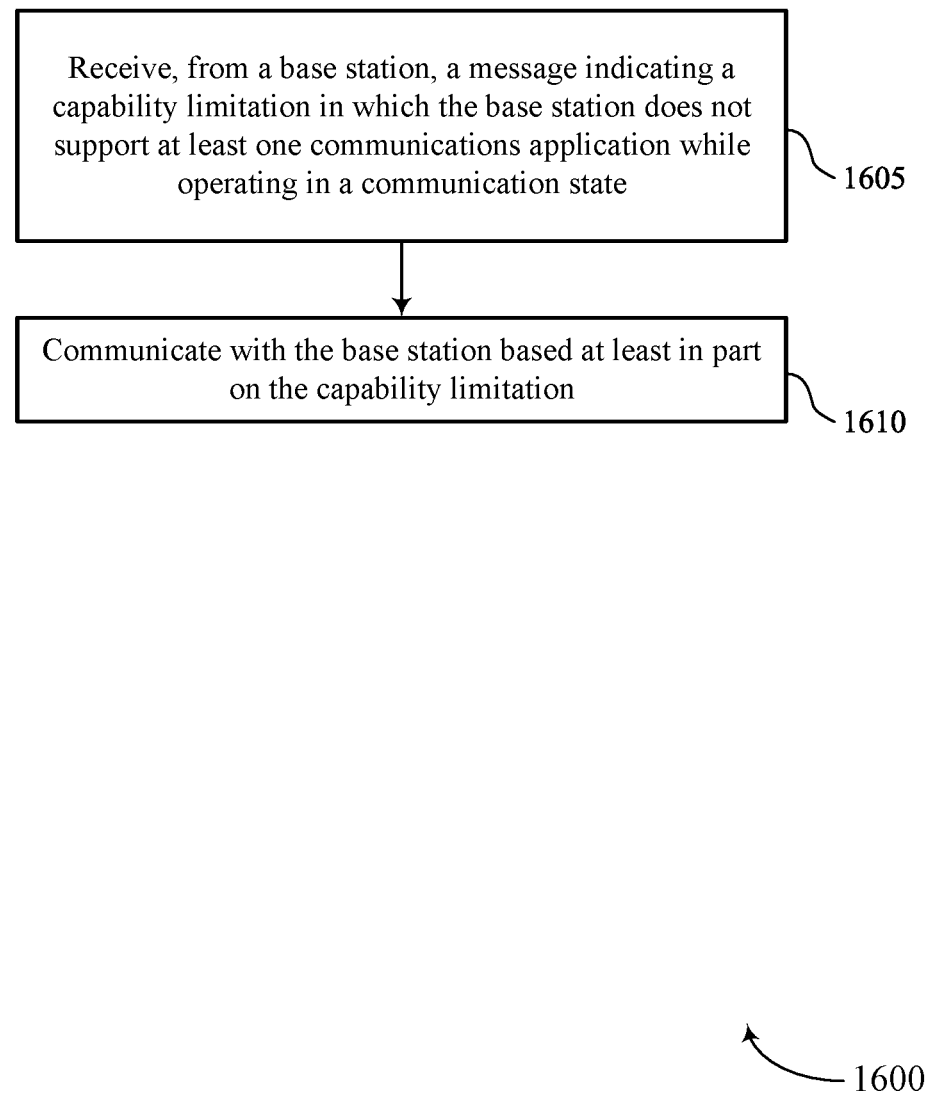

FIG. 16 shows a flowchart illustrating a method 1600 that supports communications state switching of a base station in accordance with aspects of the present disclosure. The operations of the method 1600 may be implemented by a UE or its components as described herein. For example, the operations of the method 1600 may be performed by a UE 115 as described with reference to FIGS. 1 through 5 and 10 through 13. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a message indicating a capability limitation in which the base station does not support at least one communications application while operating in a communication state. The operations of 1605 may be performed in accordance with examples as disclosed herein. In some examples, aspects of the operations of 1605 may be performed by a network capability manager 1225 as described with reference to FIG. 12.

At 1610, the method may include communicating with the base station based on the capability limitation. The operations of 1610 may be performed in accordance with examples as disclosed herein. In some examples, aspects of the operations of 1610 may be performed by a direct link manager 1230 as described with reference to FIG. 12.

Figure 17:
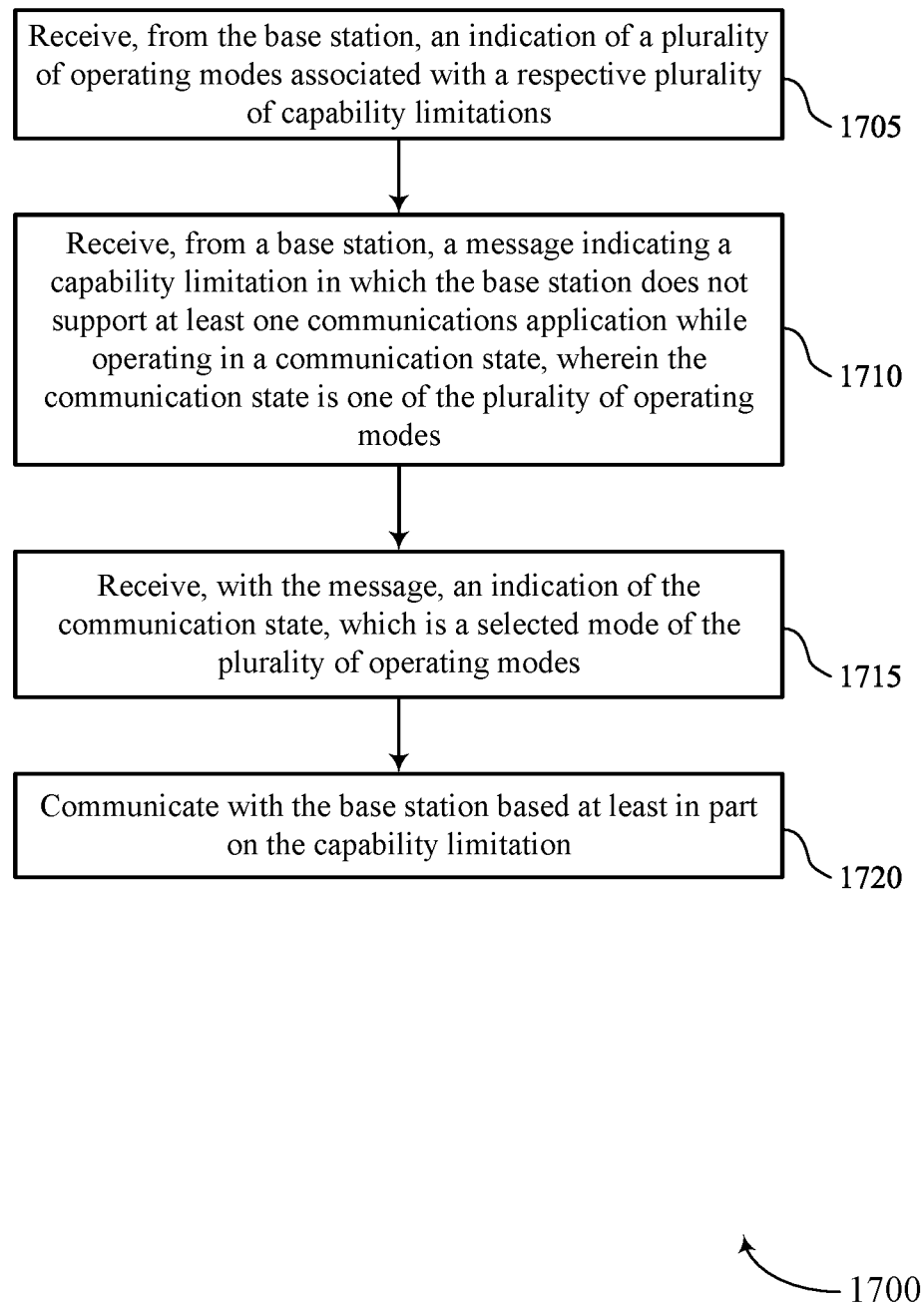

FIG. 17 shows a flowchart illustrating a method 1700 that supports communications state switching of a base station in accordance with aspects of the present disclosure. The operations of the method 1700 may be implemented by a UE or its components as described herein. For example, the operations of the method 1700 may be performed by a UE 115 as described with reference to FIGS. 1 through 5 and 10 through 13. In some examples, a UE may execute a set of instructions to control the functional elements of the UE to perform the described functions. Additionally or alternatively, the UE may perform aspects of the described functions using special-purpose hardware.

At 1705, the method may include receiving, from the base station, an indication of a set of multiple operating modes associated with a respective set of multiple capability limitations. The operations of 1705 may be performed in accordance with examples as disclosed herein. In some examples, aspects of the operations of 1705 may be performed by a network operating mode manager 1240 as described with reference to FIG. 12.

At 1710, the method may include receiving, from a base station, a message indicating a capability limitation in which the base station does not support at least one communications application while operating in a communication state, where the communication state is one of the set of multiple operating modes. The operations of 1710 may be performed in accordance with examples as disclosed herein. In some examples, aspects of the operations of 1710 may be performed by a network capability manager 1225 as described with reference to FIG. 12.

At 1715, the method may include receiving, with the message, an indication of the communication state, which is a selected mode of the set of multiple operating modes. The operations of 1715 may be performed in accordance with examples as disclosed herein. In some examples, aspects of the operations of 1715 may be performed by a network operating mode manager 1240 as described with reference to FIG. 12.

At 1720, the method may include communicating with the base station based on the capability limitation. The operations of 1720 may be performed in accordance with examples as disclosed herein. In some examples, aspects of the operations of 1720 may be performed by a direct link manager 1230 as described with reference to FIG. 12.

Figure 18:
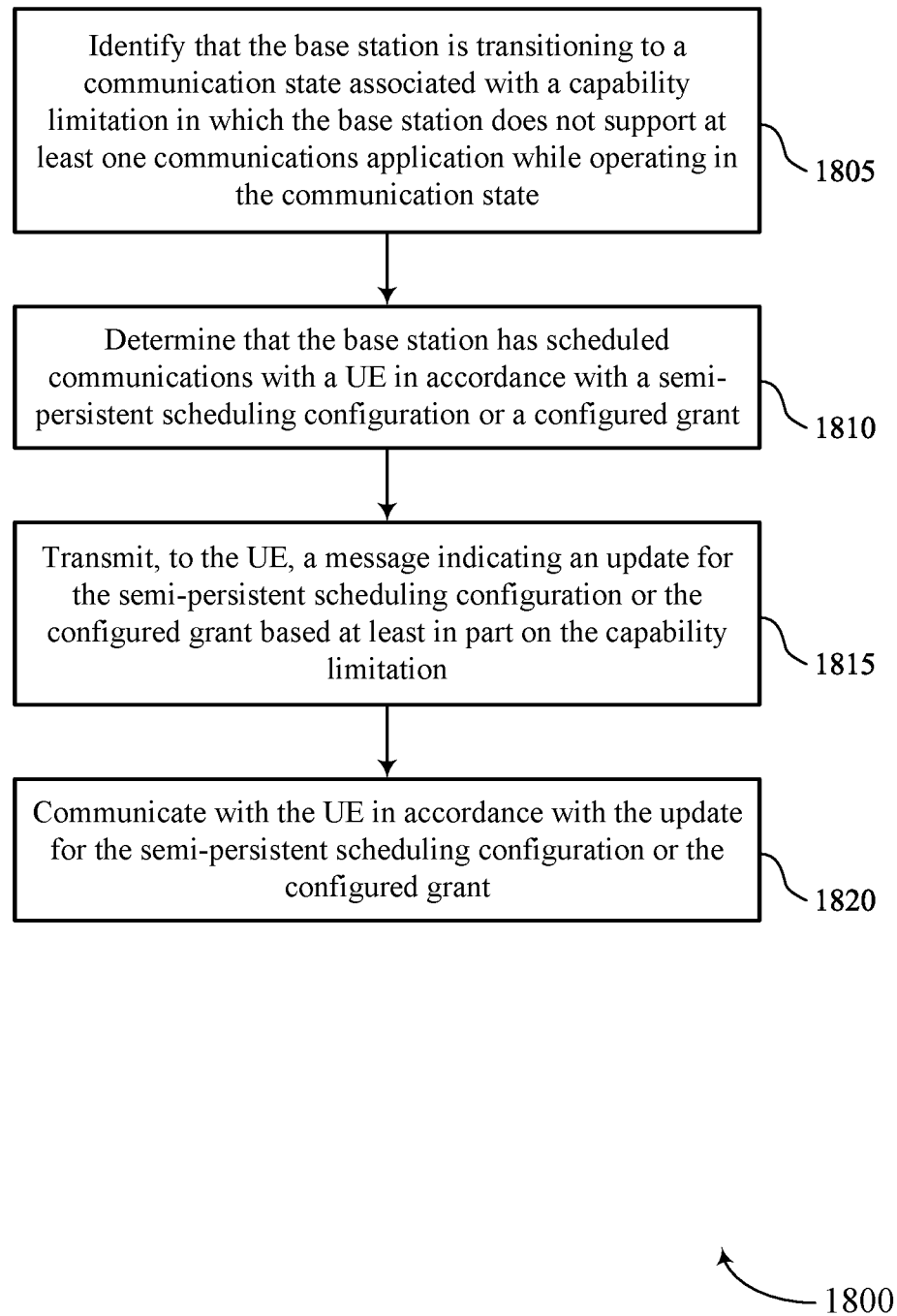

FIG. 18 shows a flowchart illustrating a method 1800 that supports communications state switching of a base station in accordance with aspects of the present disclosure. The operations of the method 1800 may be implemented by a base station or its components as described herein. For example, the operations of the method 1800 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1805, the method may include identifying that the base station is transitioning to a communication state associated with a capability limitation in which the base station does not support at least one communications application while operating in the communication state. The operations of 1805 may be performed in accordance with examples as disclosed herein. In some examples, aspects of the operations of 1805 may be performed by an operating mode manager 825 as described with reference to FIG. 8.

At 1810, the method may include determining that the base station has scheduled communications with a UE in accordance with an SPS configuration or a configured grant. The operations of 1810 may be performed in accordance with examples as disclosed herein. In some examples, aspects of the operations of 1810 may be performed by a communications scheduling manager 840 as described with reference to FIG. 8.

At 1815, the method may include transmitting, to the UE, a message indicating an update for the SPS configuration or the configured grant based on the capability limitation. The operations of 1815 may be performed in accordance with examples as disclosed herein. In some examples, aspects of the operations of 1815 may be performed by a communications scheduling manager 840 as described with reference to FIG. 8.

At 1820, the method may include communicating with the UE in accordance with the update for the SPS configuration or the configured grant. The operations of 1820 may be performed in accordance with examples as disclosed herein. In some examples, aspects of the operations of 1820 may be performed by a direct link manager 835 as described with reference to FIG. 8.

Figure 19:
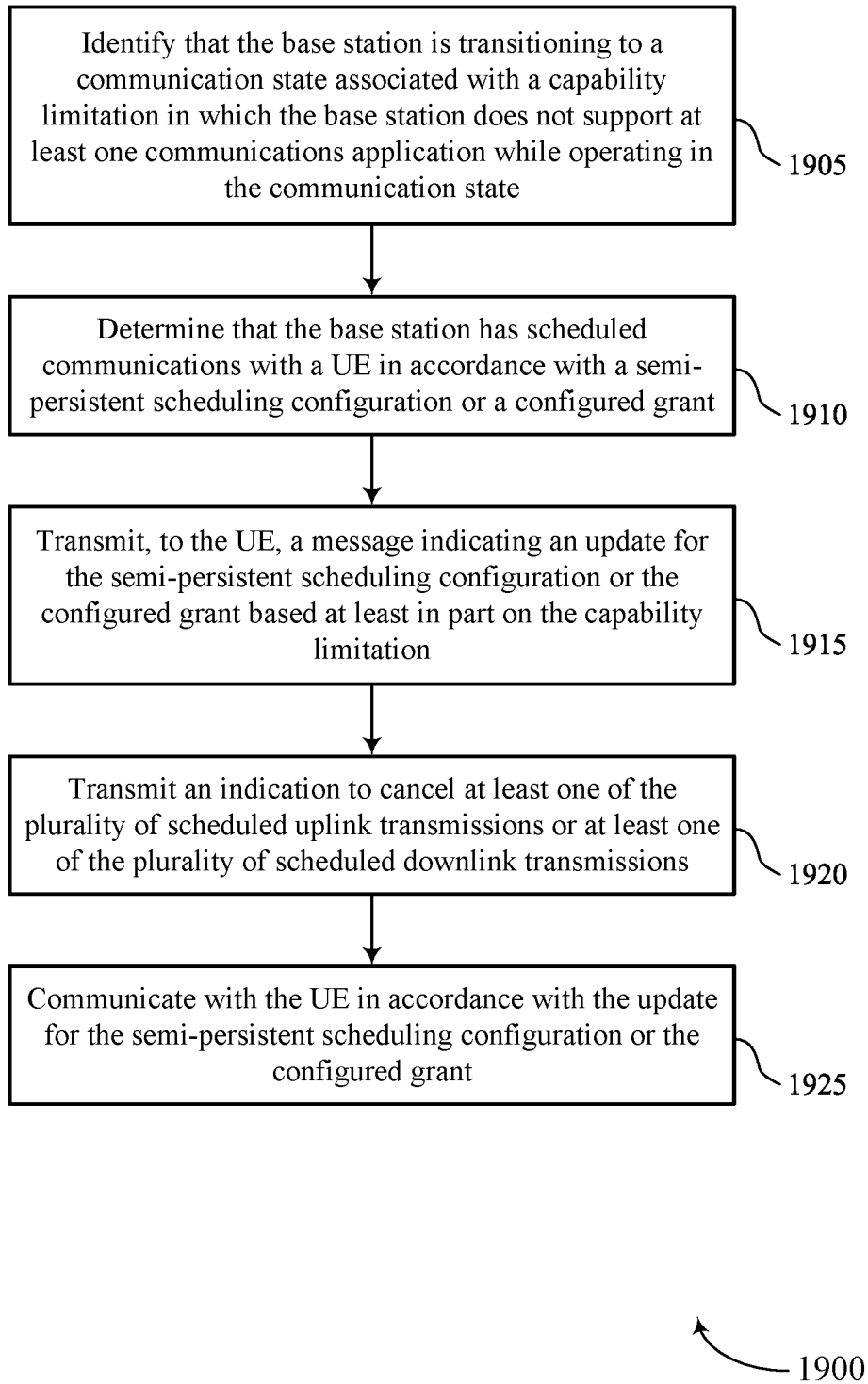

FIG. 19 shows a flowchart illustrating a method 1900 that supports communications state switching of a base station in accordance with aspects of the present disclosure. The operations of the method 1900 may be implemented by a base station or its components as described herein. For example, the operations of the method 1900 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1905, the method may include identifying that the base station is transitioning to a communication state associated with a capability limitation in which the base station does not support at least one communications application while operating in the communication state. The operations of 1905 may be performed in accordance with examples as disclosed herein. In some examples, aspects of the operations of 1905 may be performed by an operating mode manager 825 as described with reference to FIG. 8.

At 1910, the method may include determining that the base station has scheduled communications with a UE in accordance with an SPS configuration or a configured grant, where the SPS configuration includes a set of scheduled uplink transmissions or the configured grant includes a set of scheduled downlink transmissions. The operations of 1910 may be performed in accordance with examples as disclosed herein. In some examples, aspects of the operations of 1910 may be performed by a communications scheduling manager 840 as described with reference to FIG. 8.

At 1915, the method may include transmitting, to the UE, a message indicating an update for the SPS configuration or the configured grant based on the capability limitation. The operations of 1915 may be performed in accordance with examples as disclosed herein. In some examples, aspects of the operations of 1915 may be performed by a communications scheduling manager 840 as described with reference to FIG. 8.

At 1920, the method may include transmitting an indication to cancel at least one of the set of multiple scheduled uplink transmissions or at least one of the set of multiple scheduled downlink transmissions. The operations of 1920 may be performed in accordance with examples as disclosed herein. In some examples, aspects of the operations of 1920 may be performed by a communications scheduling manager 840 as described with reference to FIG. 8.

At 1925, the method may include communicating with the UE in accordance with the update for the SPS configuration or the configured grant. The operations of 1925 may be performed in accordance with examples as disclosed herein. In some examples, aspects of the operations of 1925 may be performed by a direct link manager 835 as described with reference to FIG. 8.

Figure 20:
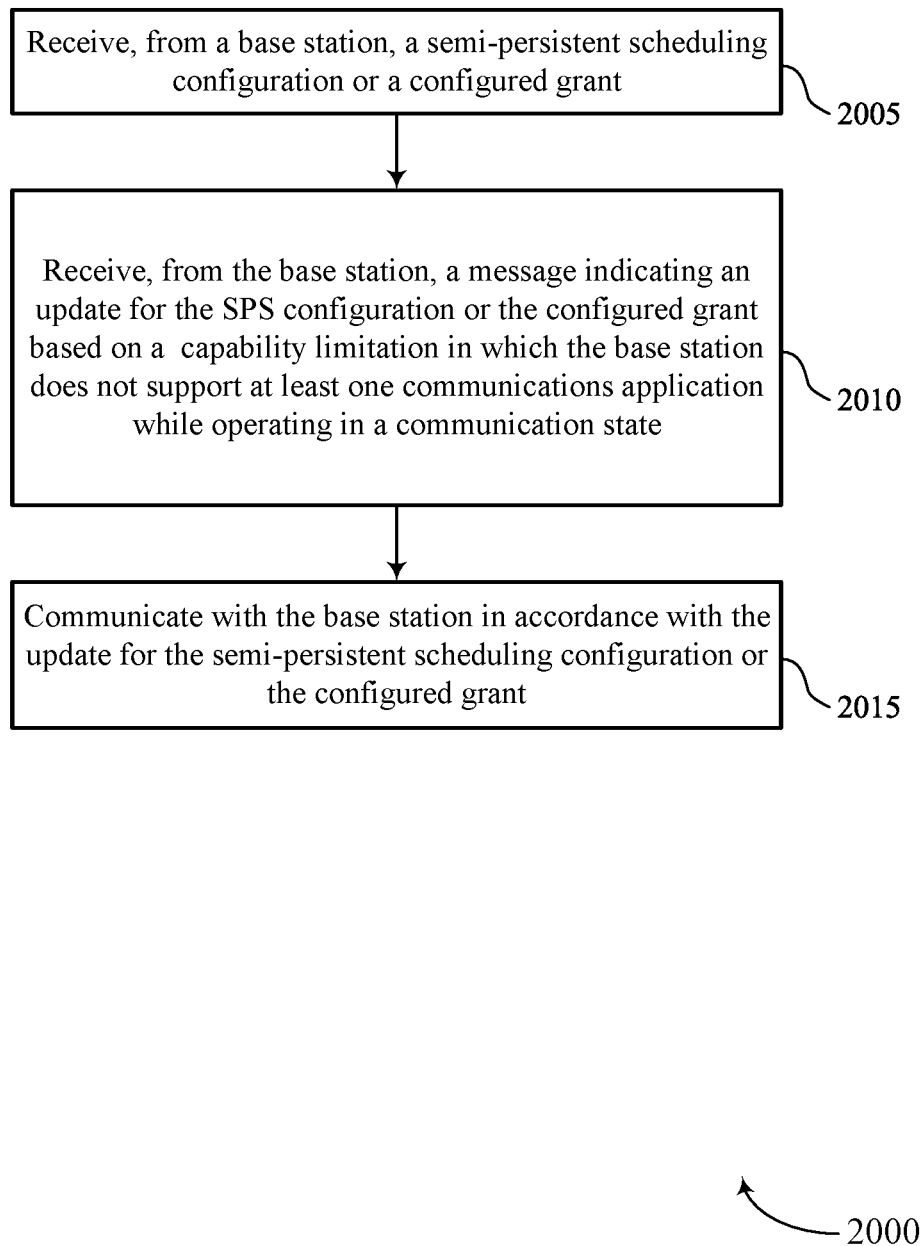

FIG. 20 shows a flowchart illustrating a method 2000 that supports communications state switching of a base station in accordance with aspects of the present disclosure. The operations of the method 2000 may be implemented by a UE or its components as described herein. For example, the operations of the method 2000 may be performed by a UE 115 as described with reference to FIGS. 1 through 5 and 10 through 13. In some examples, a UE may execute a set of instructions to control the functional elements of the UE to perform the described functions. Additionally or alternatively, the UE may perform aspects of the described functions using special-purpose hardware.

At 2005, the method may include receiving, from a base station, an SPS configuration or a configured grant. The operations of 2005 may be performed in accordance with examples as disclosed herein. In some examples, aspects of the operations of 2005 may be performed by a scheduled communications manager 1235 as described with reference to FIG. 12.

At 2010, the method may include receiving, from the base station, a message indicating an update for the SPS configuration or the configured grant based on a capability limitation in which the base station does not support at least one communications application while operating in a communication state. The operations of 2010 may be performed in accordance with examples as disclosed herein. In some examples, aspects of the operations of 2010 may be performed by a scheduled communications manager 1235 as described with reference to FIG. 12.

At 2015, the method may include communicating with the base station in accordance with the update for the SPS configuration or the configured grant. The operations of 2015 may be performed in accordance with examples as disclosed herein. In some examples, aspects of the operations of 2015 may be performed by a direct link manager 1230 as described with reference to FIG. 12.

Figure 21:
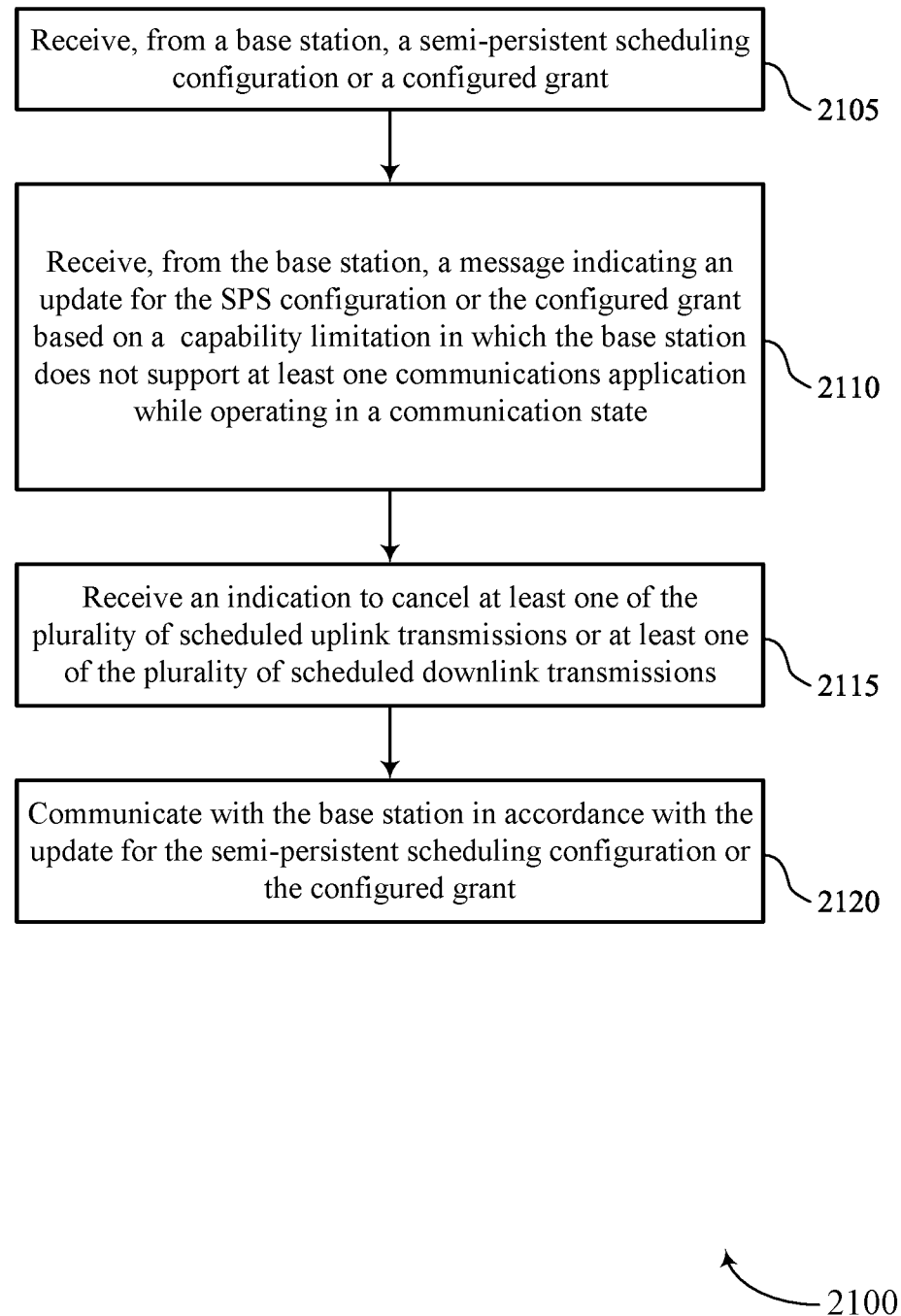

FIG. 21 shows a flowchart illustrating a method 2100 that supports communications state switching of a base station in accordance with aspects of the present disclosure. The operations of the method 2100 may be implemented by a UE or its components as described herein. For example, the operations of the method 2100 may be performed by a UE 115 as described with reference to FIGS. 1 through 5 and 10 through 13. In some examples, a UE may execute a set of instructions to control the functional elements of the UE to perform the described functions. Additionally or alternatively, the UE may perform aspects of the described functions using special-purpose hardware.

At 2105, the method may include receiving, from a base station, an SPS configuration or a configured grant, where the SPS configuration includes a set of scheduled uplink transmissions or the configured grant includes a set of scheduled downlink transmissions. The operations of 2105 may be performed in accordance with examples as disclosed herein. In some examples, aspects of the operations of 2105 may be performed by a scheduled communications manager 1235 as described with reference to FIG. 12.

At 2110, the method may include receiving, from the base station, a message indicating an update for the SPS configuration or the configured grant based on a capability limitation in which the base station does not support at least one communications application while operating in a communication state. The operations of 2110 may be performed in accordance with examples as disclosed herein. In some examples, aspects of the operations of 2110 may be performed by a scheduled communications manager 1235 as described with reference to FIG. 12.

At 2115, the method may include receiving an indication to cancel at least one of the set of multiple scheduled uplink transmissions or at least one of the set of multiple scheduled downlink transmissions. The operations of 2115 may be performed in accordance with examples as disclosed herein. In some examples, aspects of the operations of 2115 may be performed by a scheduled communications manager 1235 as described with reference to FIG. 12.

At 2120, the method may include communicating with the base station in accordance with the update for the SPS configuration or the configured grant. The operations of 2120 may be performed in accordance with examples as disclosed herein. In some examples, aspects of the operations of 2120 may be performed by a direct link manager 1230 as described with reference to FIG. 12.

The following provides an overview of aspects of the present disclosure:

Aspect 1: A method for wireless communications at a base station, comprising: identifying that the base station is transitioning to communication state associated with a capability limitation in which the base station does not support at least one communications application while operating in the communication state; transmitting, to a UE, a message indicating the capability limitation; and communicating with the UE in the communication state based at least in part on the capability limitation.

Aspect 2: The method of aspect 1, further comprising: transmitting, to the UE, an indication of a plurality of operating modes associated with a respective plurality of capability limitations, wherein the communication state is one of the plurality of operating modes.

Aspect 3: The method of aspect 2, wherein transmitting the message indicating the capability limitation comprises: transmitting, with the message, an indication of the communication state, which is a selected mode of the plurality of operating modes.

Aspect 4: The method of aspect 3, wherein the plurality of operating modes are associated with support for URLLC with a first delay requirement, URLLC with a second delay requirement, URLLC with a first block error ratio, URLLC with a second block error ratio, enhanced mobile broadband, or a combination thereof.

Aspect 5: The method of any of aspects 2 through 4, further comprising: transmitting, to the UE, an indication of a respective resource allocation for the UE for communications in a sidelink mode for each of the plurality of operating modes.

Aspect 6: The method of any of aspects 2 through 5, wherein each of the plurality of operating modes is associated with a respective quality of service target of a plurality of quality of service targets, and wherein identifying that the base station is transitioning to the communication state comprises: identifying a quality of service target associated with the communication state from the plurality of quality of service targets.

Aspect 7: The method of any of aspects 2 through 6, further comprising: communicating with a plurality of UEs, wherein the plurality of UEs includes the UE; and receiving, from each UE of the plurality of UEs, communications metric feedback information, wherein each operating mode of the plurality of operating modes is associated with one of a plurality of thresholds associated with a communications metric.

Aspect 8: The method of any of aspects 2 through 7, wherein a first mode of the plurality of operating modes corresponds to an acknowledgement and negative acknowledgement mode, a second mode of the plurality of operating modes corresponds to an acknowledgement only mode, a third mode of the plurality of operating modes corresponds to a negative acknowledgement only mode, and a fourth mode of the plurality of operating modes corresponds to a non-feedback mode.

Aspect 9: The method of any of aspects 1 through 8, further comprising: communicating with a plurality of UEs, wherein the plurality of UEs includes the UE, and wherein identifying that the base station is transitioning to the communication state comprises: identifying that a threshold number of UEs of the plurality of UEs are associated with one or more communications metrics satisfying one or more thresholds.

Aspect 10: The method of aspect 9, wherein the one or more communications metrics comprise an estimated pathloss, a signal to interference and noise ratio, a reference signal received power, or a combination thereof.

Aspect 11: The method of any of aspects 1 through 10, further comprising: communicating with a plurality of UEs, wherein the plurality of UEs includes the UE; and determining a power condition to maintain a quality of service target with the plurality of UEs, and wherein identifying that the base station is transitioning to the communication state is based at least in part on the determined power condition.

Aspect 12: The method of any of aspects 1 through 11, wherein the communication state is associated with an energy saving mode.

Aspect 13: The method of any of aspects 1 through 12, wherein transmitting the message comprises: transmitting the message via a DCI signal or a MAC-CE signal.

Aspect 14: The method of any of aspects 1 through 13, further comprising: determining that the base station has scheduled communications with the UE in accordance with an SPS configuration or a configured grant; and transmitting, with the message, an indication of an update for the SPS configuration or the configured grant based at least in part on the capability limitation, and wherein communicating with the UE in the communication state based at least in part on the capability limitation comprises: communicating with the UE in accordance with the update for the SPS configuration or the configured grant.

Aspect 15: The method of aspect 14, wherein the SPS configuration comprises a plurality of scheduled uplink transmissions or the configured grant comprises a plurality of scheduled downlink transmissions, and wherein transmitting the message comprises: transmitting an indication to cancel at least one of the plurality of scheduled uplink transmissions or at least one of the plurality of scheduled downlink transmissions.

Aspect 16: The method of any of aspects 14 through 15, wherein the communication state is one of a plurality of operating modes, and wherein each operating mode of the plurality of operating modes is associated with a respective time domain resource allocation, a respective operating bandwidth, or a respective resource block allocation, the method further comprising: transmitting, with the message, an indication of the respective time domain resource allocation, the respective operating bandwidth, or the respective resource block allocation associated with the communication state.

Aspect 17: A method for wireless communications at a UE, comprising: receiving, from a base station, a message indicating a capability limitation in which the base station does not support at least one communications application while operating in a communication state; and communicating with the base station based at least in part on the capability limitation of the communication state.

Aspect 18: The method of aspect 17, further comprising: receiving, from the base station, an indication of a plurality of operating modes associated with a respective plurality of capability limitations, wherein the communication state is one of the plurality of operating modes.

Aspect 19: The method of aspect 18, wherein receiving the message indicating the capability limitation comprises: receiving, with the message, an indication of the communication state, which is a selected mode of the plurality of operating modes.

Aspect 20: The method of aspect 19, wherein the plurality of operating modes are associated with an ability to support URLLC with a first delay requirement, URLLC with a second delay requirement, URLLC with a first block error ratio, URLLC with a second block error ratio, enhanced mobile broadband, or a combination thereof.

Aspect 21: The method of any of aspects 18 through 20, further comprising: receiving, from the base station, an indication of a respective resource allocation for the UE for communications in a sidelink mode for each of the plurality of operating modes.

Aspect 22: The method of any of aspects 18 through 21, wherein a first mode of the plurality of operating modes corresponds to an acknowledgement and negative acknowledgement mode, a second mode of the plurality of operating modes corresponds to an acknowledgement only mode, a third mode of the plurality of operating modes corresponds to a negative acknowledgement only mode, and a fourth mode of the plurality of operating modes corresponds to a non-feedback mode.

Aspect 23: The method of any of aspects 17 through 22, wherein the communication state is associated with an energy saving mode.

Aspect 24: The method of any of aspects 17 through 23, wherein receiving the message comprises: receiving the message via a DCI signal or a MAC-CE signal.

Aspect 25: The method of any of aspects 17 through 24, further comprising: receiving, from the base station, an SPS configuration or a configured grant; and receiving, with the message, an update for the SPS configuration or the configured grant based at least in part on the capability limitation, wherein communicating with the base station based at least in part on the capability limitation of the communication state comprises: communicating with the base station in accordance with the update for the SPS configuration or the configured grant.

Aspect 26: The method of aspect 25, wherein the SPS configuration comprises a plurality of scheduled uplink transmissions or the configured grant comprises a plurality of scheduled downlink transmissions, and wherein receiving the message comprises: receiving an indication to cancel at least one of the plurality of scheduled uplink transmissions or at least one of the plurality of scheduled downlink transmissions.

Aspect 27: The method of any of aspects 25 through 26, wherein the communication state is one of a plurality of operating modes, and wherein each operating mode of the plurality of operating modes is associated with a respective time domain resource allocation, a respective operating bandwidth, or a respective resource block allocation, the method further comprising: receiving, with the message, an indication of the respective time domain resource allocation, the respective operating bandwidth, or the respective resource block allocation associated with the communication state.

Aspect 28: A method for wireless communications at a base station, comprising: identifying that the base station is transitioning to a communication state associated with a capability limitation in which the base station does not support at least one communications application while operating in the communication state; determining that the base station has scheduled communications with a UE in accordance with an SPS configuration or a configured grant; transmitting, to the UE, a message indicating an update for the SPS configuration or the configured grant based at least in part on the capability limitation; and communicating with the UE in accordance with the update for the SPS configuration or the configured grant.

Aspect 29: The method of aspect 28, wherein the SPS configuration comprises a plurality of scheduled uplink transmissions or the configured grant comprises a plurality of scheduled downlink transmissions, and wherein transmitting the message comprises: transmitting an indication to cancel at least one of the plurality of scheduled uplink transmissions or at least one of the plurality of scheduled downlink transmissions.

Aspect 30: The method of any of aspects 28 through 29, wherein the communication state is one of a plurality of operating modes, and wherein each operating mode of the plurality of operating modes is associated with a respective time domain resource allocation, the method further comprising: transmitting, with the message, an indication of the respective time domain resource allocation associated with the communication state.

Aspect 31: The method of any of aspects 28 through 30, wherein the communication state is one of a plurality of operating modes, and wherein each operating mode of the plurality of operating modes is associated with a respective operating bandwidth or a respective resource block allocation, the method further comprising: transmitting, with the message, an indication of the respective operating bandwidth or the respective resource block allocation associated with the communication state.

Aspect 32: The method of any of aspects 28 through 31, wherein the communication state is one of a plurality of operating modes, and wherein each operating mode of the plurality of operating modes is associated with a respective set of beams, a respective modulation and coding scheme, a respective rank, or a combination thereof, the method further comprising: transmitting, with the message, an indication of the respective set of beams, the respective modulation and coding scheme, the respective rank, or combination thereof associated with the communication state.

Aspect 33: The method of any of aspects 28 through 32, wherein transmitting the message comprises: transmitting the message via a radio resource control signal or via a medium access control (MAC) control element (CE).

Aspect 34: The method of any of aspects 28 through 33, wherein the SPS configuration or the configured grant is associated with a first periodicity, and wherein transmitting the message comprises: transmitting with the message an indication of a second periodicity that is longer than the first periodicity, and wherein communicating with the UE in accordance with the update comprises: communicating with the UE in accordance with the second periodicity.

Aspect 35: The method of any of aspects 28 through 34, wherein the SPS configuration comprises a plurality of SPS indices associated with a plurality of communications applications, wherein the plurality of communications applications includes the at least one communications application, further comprising: transmitting, with the message, an indication to deactivate an SPS index of the plurality of SPS indices associated with the at least one communications application.

Aspect 36: The method of any of aspects 28 through 35, wherein the communication state is associated with an energy saving mode.

Aspect 37: The method of any of aspects 28 through 36, wherein transmitting the message comprises: transmitting the message via a DCI signal or a MAC-CE signal.

Aspect 38: A method for wireless communications at a UE, comprising: receiving, from a base station, an SPS configuration or a configured grant; receiving, from the base station, a message indicating an update for the SPS configuration or the configured grant based at least in part on a capability limitation in which the base station does not support at least one communications application while operating in a communication state; and communicating with the base station in accordance with the update for the SPS configuration or the configured grant.

Aspect 39: The method of aspect 38, wherein the SPS configuration comprises a plurality of scheduled uplink transmissions or the configured grant comprises a plurality of scheduled downlink transmissions, and wherein receiving the message comprises: receiving an indication to cancel at least one of the plurality of scheduled uplink transmissions or at least one of the plurality of scheduled downlink transmissions.

Aspect 40: The method of any of aspects 38 through 39, wherein the communication state is one of a plurality of operating modes, and wherein each operating mode of the plurality of operating modes is associated with a respective time domain resource allocation, the method further comprising: receiving, with the message, an indication of the respective time domain resource allocation associated with the communication state.

Aspect 41: The method of any of aspects 38 through 40, wherein the communication state is one of a plurality of operating modes, and wherein each operating mode of the plurality of operating modes is associated with a respective operating bandwidth or a respective resource block allocation, the method further comprising: receiving, with the message, an indication of the respective operating bandwidth or the respective resource block allocation associated with the communication state.

Aspect 42: The method of any of aspects 38 through 41, wherein the communication state is one of a plurality of operating modes, and wherein each operating mode of the plurality of operating modes is associated with a respective set of beams, a respective modulation and coding scheme, a respective rank, or a combination thereof, the method further comprising: transmitting, with the message, an indication of the respective set of beams, the respective modulation and coding scheme, the respective rank, or combination thereof associated with the communication state.

Aspect 43: The method of any of aspects 38 through 42, wherein the communication state is associated with an energy saving mode.

Aspect 44: The method of any of aspects 38 through 43, wherein receiving the message comprises: receiving the message via a DCI signal or a MAC-CE signal.

Aspect 45: An apparatus for wireless communications at a base station, comprising a processor; memory coupled with the processor; and instructions stored in the memory and executable by the processor to cause the apparatus to perform a method of any of aspects 1 through 16.

Aspect 46: An apparatus for wireless communications at a base station, comprising at least one means for performing a method of any of aspects 1 through 16.

Aspect 47: A non-transitory computer-readable medium storing code for wireless communications at a base station, the code comprising instructions executable by a processor to perform a method of any of aspects 1 through 16.

Aspect 48: An apparatus for wireless communications at a UE, comprising a processor; memory coupled with the processor; and instructions stored in the memory and executable by the processor to cause the apparatus to perform a method of any of aspects 17 through 27.

Aspect 49: An apparatus for wireless communications at a UE, comprising at least one means for performing a method of any of aspects 17 through 27.

Aspect 50: A non-transitory computer-readable medium storing code for wireless communications at a UE, the code comprising instructions executable by a processor to perform a method of any of aspects 17 through 27.

Aspect 51: An apparatus for wireless communications at a base station, comprising a processor; memory coupled with the processor; and instructions stored in the memory and executable by the processor to cause the apparatus to perform a method of any of aspects 28 through 37.

Aspect 52: An apparatus for wireless communications at a base station, comprising at least one means for performing a method of any of aspects 28 through 37.

Aspect 53: A non-transitory computer-readable medium storing code for wireless communications at a base station, the code comprising instructions executable by a processor to perform a method of any of aspects 28 through 37.

Aspect 54: An apparatus for wireless communications at a UE, comprising a processor; memory coupled with the processor; and instructions stored in the memory and executable by the processor to cause the apparatus to perform a method of any of aspects 38 through 44.

Aspect 55: An apparatus for wireless communications at a UE, comprising at least one means for performing a method of any of aspects 38 through 44.

Aspect 56: A non-transitory computer-readable medium storing code for wireless communications at a UE, the code comprising instructions executable by a processor to perform a method of any of aspects 38 through 44.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a network device, comprising:
   identifying that the network device is transitioning to a communication state associated with a capability limitation in which the network device does not support at least one communications application while operating in the communication state;
   transmitting, to a user equipment (UE), a message indicating the capability limitation; and
   communicating with the UE in the communication state based at least in part on the capability limitation.

2. The method of claim 1, further comprising:
   transmitting, to the UE, an indication of a plurality of operating modes associated with a respective plurality of capability limitations, wherein the communication state is one of the plurality of operating modes.

3. The method of claim 2, wherein transmitting the message indicating the capability limitation comprises:
   transmitting, with the message, an indication of the communication state, which is a selected mode of the plurality of operating modes.

4. The method of claim 3, wherein the plurality of operating modes are associated with support for ultra reliable low latency communications with a first delay requirement, ultra reliable low latency communications with a second delay requirement, ultra reliable low latency communications with a first block error ratio, ultra reliable low latency communications with a second block error ratio, enhanced mobile broadband, or a combination thereof.

5. The method of claim 2, further comprising:
   transmitting, to the UE, an indication of a respective resource allocation for the UE for communications in a sidelink mode for each of the plurality of operating modes.

6. The method of claim 2, wherein each of the plurality of operating modes is associated with a respective quality of service target of a plurality of quality of service targets, and wherein identifying that the network device is transitioning to the communication state comprises:
   identifying a quality of service target associated with the communication state from the plurality of quality of service targets.

7. The method of claim 2, further comprising:
   communicating with a plurality of UEs, wherein the plurality of UEs includes the UE; and
   receiving, from each UE of the plurality of UEs, communications metric feedback information, wherein each operating mode of the plurality of operating modes is associated with one of a plurality of thresholds associated with a communications metric.

8. The method of claim 2, wherein a first mode of the plurality of operating modes corresponds to an acknowledgement and negative acknowledgement mode, a second mode of the plurality of operating modes corresponds to an acknowledgement only mode, a third mode of the plurality of operating modes corresponds to a negative acknowledgement only mode, and a fourth mode of the plurality of operating modes corresponds to a non-feedback mode.

9. The method of claim 1, further comprising:
   communicating with a plurality of UEs, wherein the plurality of UEs includes the UE, and wherein identifying that the network device is transitioning to the communication state comprises:
   identifying that a threshold number of UEs of the plurality of UEs are associated with one or more communications metrics satisfying one or more thresholds.

10. The method of claim 9, wherein the one or more communications metrics comprise an estimated pathloss, a signal to interference and noise ratio, a reference signal received power, or a combination thereof.

11. The method of claim 1, further comprising:
    communicating with a plurality of UEs, wherein the plurality of UEs includes the UE; and determining a power condition to maintain a quality of service target with the plurality of UEs, and wherein identifying that the network device is transitioning to the communication state is based at least in part on the determined power condition.

12. The method of claim 1, wherein the communication state is associated with an energy saving mode.

13. The method of claim 1, wherein:
determining that the network device has scheduled communications with the UE in accordance with a semi-persistent scheduling configuration or a configured grant;
and transmitting, with the message, an indication of an update for the semi-persistent scheduling configuration or the configured grant based at least in part on the capability limitation, and wherein communicating with the UE in the communication state based at least in part on the capability limitation comprises:
communicating with the UE in accordance with the update for the semi-persistent scheduling configuration or the configured grant.

14. The method of claim 13, wherein the semi-persistent scheduling configuration comprises a plurality of scheduled uplink transmissions or the configured grant comprises a plurality of scheduled downlink transmissions, and wherein transmitting the message comprises:
transmitting an indication to cancel at least one of the plurality of scheduled uplink transmissions or at least one of the plurality of scheduled downlink transmissions.

15. The method of claim 13, wherein the communication state is one of a plurality of operating modes, and wherein each operating mode of the plurality of operating modes is associated with a respective time domain resource allocation, a respective operating bandwidth, or a respective resource block allocation, the method further comprising:
transmitting, with the message, an indication of the respective time domain resource allocation, the respective operating bandwidth, or the respective resource block allocation associated with the communication state.

16. A method for wireless communications at a user equipment (UE), comprising:
receiving, from a network device, a message indicating a capability limitation in which the network device does not support at least one communications application while operating in a communication state; and
communicating with the network device based at least in part on the capability limitation of the communication state.

17. The method of claim 16, further comprising:
receiving, from the network device, an indication of a plurality of operating modes associated with a respective plurality of capability limitations, wherein the communication state is one of the plurality of operating modes.

18. The method of claim 17, wherein receiving the message indicating the capability limitation comprises:
receiving, with the message, an indication of the communication state, which is a selected mode of the plurality of operating modes.

19. The method of claim 18, wherein the plurality of operating modes are associated with an ability to support ultra reliable low latency communications with a first delay requirement, ultra reliable low latency communications with a second delay requirement, ultra reliable low latency communications with a first block error ratio, ultra reliable low latency communications with a second block error ratio, enhanced mobile broadband, or a combination thereof.

20. The method of claim 17, further comprising:
receiving, from the network device, an indication of a respective resource allocation for the UE for communications in a sidelink mode for each of the plurality of operating modes.

21. The method of claim 17, wherein a first mode of the plurality of operating modes corresponds to an acknowledgement and negative acknowledgement mode, a second mode of the plurality of operating modes corresponds to an acknowledgement only mode, a third mode of the plurality of operating modes corresponds to a negative acknowledgement only mode, and a fourth mode of the plurality of operating modes corresponds to a non-feedback mode.

22. The method of claim 17, wherein the communication state is associated with an energy saving mode.

23. The method of claim 16, wherein:
receiving, from the network device, a semi-persistent scheduling configuration or a configured grant; and
receiving, with the message, an update for the semi-persistent scheduling configuration or the configured grant based at least in part on the capability limitation, wherein communicating with the network device based at least in part on the capability limitation of the communication state comprises:
communicating with the network device in accordance with the update for the semi-persistent scheduling configuration or the configured grant.

24. The method of claim 23, wherein the semi-persistent scheduling configuration comprises a plurality of scheduled uplink transmissions or the configured grant comprises a plurality of scheduled downlink transmissions, and wherein receiving the message comprises:
receiving an indication to cancel at least one of the plurality of scheduled uplink transmissions or at least one of the plurality of scheduled downlink transmissions.

25. The method of claim 23, wherein the communication state is one of a plurality of operating modes, and wherein each operating mode of the plurality of operating modes is associated with a respective time domain resource allocation, a respective operating bandwidth, or a respective resource block allocation, the method further comprising:
receiving, with the message, an indication of the respective time domain resource allocation, the respective operating bandwidth, or the respective resource block allocation associated with the communication state.

26. A network device, comprising:
at least one processor;
memory coupled with the at least one processor; and
instructions stored in the memory and executable by the at least one processor to cause the network device to:
identify that the network device is transitioning to a communication state associated with a capability limitation in which the network device does not support at least one communications application while operating in the communication state;
transmit, to a user equipment (UE), a message indicating the capability limitation; and
communicate with the UE in the communication state based at least in part on the capability limitation.

27. The network device of claim 26, wherein the instructions are further executable by the at least one processor to cause the network device to:
transmit, to the UE, an indication of a plurality of operating modes associated with a respective plurality of capability limitations, wherein the communication state is one of the plurality of operating modes.

28. The network device of claim 27, wherein the instructions to transmit the message indicating the capability limitation are executable by the at least one processor to cause the network device to:
   transmit, with the message, an indication of the communication state, which is a selected mode of the plurality of operating modes.

29. A user equipment (UE), comprising:
   at least one processor;
   memory coupled with the at least one processor; and
   instructions stored in the memory and executable by the at least one processor to cause the UE to:
      receive, from a network device, a message indicating a capability limitation in which the network device does not support at least one communications application while operating in a communication state; and
      communicate with the network device based at least in part on the capability limitation of the communication state.

30. The UE of claim 29, wherein the instructions are further executable by the at least one processor to cause the UE to:
   receive, from the network device, an indication of a plurality of operating modes associated with a respective plurality of capability limitations, wherein the communication state is one of the plurality of operating modes.

* * * * *